United States Patent
Han

(10) Patent No.: US 7,058,961 B2
(45) Date of Patent: Jun. 6, 2006

(54) DISK PLAYER, AND SELF-COMPENSATING-DYNAMIC-BALANCER (SCDB) INTEGRATED TURNTABLE, SCDB INTEGRATED CLAMPER AND SCDB INTEGRATED SPINDLE MOTOR EMPLOYED IN THE SAME

(75) Inventor: Ming-xing Han, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 10/801,853

(22) Filed: Mar. 17, 2004

(65) Prior Publication Data

US 2004/0177366 A1    Sep. 9, 2004

Related U.S. Application Data

(62) Division of application No. 09/955,046, filed on Sep. 19, 2001, now Pat. No. 6,731,588.

(30) Foreign Application Priority Data

Dec. 21, 2000    (KR) .............................. 2000-79735

(51) Int. Cl.
   *G11B 19/20* (2006.01)
   *F16F 15/22* (2006.01)
(52) U.S. Cl. ..................... 720/702; 720/706; 74/573 R
(58) Field of Classification Search ................ 720/701, 720/702; 73/572.4, 573.1, 573.13; 310/51
   See application file for complete search history.

(56) References Cited

U.S. PATENT DOCUMENTS

| | | | |
|---|---|---|---|
| 3,854,347 A * | 12/1974 | Hellerich | ................... 74/571.1 |
| 6,155,134 A | 12/2000 | Ikuta et al. | |
| 6,198,715 B1 | 3/2001 | Kouno et al. | |
| 6,243,351 B1 | 6/2001 | Huang | |
| 6,256,289 B1 | 7/2001 | Miyamoto | |
| 6,295,269 B1 | 9/2001 | Takeuchi et al. | |
| 6,333,912 B1 | 12/2001 | Sohn | |
| 6,373,154 B1 | 4/2002 | Sohn et al. | |
| 6,388,981 B1 | 5/2002 | Sohn et al. | |
| 6,452,896 B1 | 9/2002 | Song | |
| 6,456,583 B1 | 9/2002 | Sohn et al. | |
| 6,459,668 B1 | 10/2002 | Satou et al. | |
| 6,477,001 B1 | 11/2002 | Yang et al. | |
| 6,477,133 B1 | 11/2002 | Yoshimura et al. | |
| 6,492,750 B1 * | 12/2002 | Kikuchi et al. | ................ 310/51 |
| 6,493,311 B1 | 12/2002 | Tsai et al. | |

(Continued)

FOREIGN PATENT DOCUMENTS

EP    835185 A2    4/1998

(Continued)

*Primary Examiner*—William J Klimowicz
(74) *Attorney, Agent, or Firm*—Stein, McEwen & Bui, LLP

(57) ABSTRACT

A disk player having a self-compensating dynamic balancer so as to subdue internal vibrations due to an eccentric center of mass of a disk, a self-compensating-dynamic-balancer integrated turntable, a self-compensating-dynamic-balancer integrated clamper, and a self-compensating-dynamic-balancer integrated spindle motor which are employed in the disk player. The self-compensating dynamic balancer is embodied by forming a cavity in a turntable, clamper, a rotor of a spindle motor, or the like, and disposing movable members including movable rigid bodies and/or a liquid therein. Internal vibrations due to the eccentric mass of the disk are subdued effectively the movable members moving away from a revolution center according to respective centrifugal forces where the self-compensating dynamic balancer rotates.

19 Claims, 17 Drawing Sheets

U.S. PATENT DOCUMENTS

| | | |
|---|---|---|
| 6,507,555 B1 | 1/2003 | Masaki et al. |
| 6,535,475 B1 | 3/2003 | Sohn et al. |
| 6,731,588 B1 * | 5/2004 | Han ........................... 369/264 |

FOREIGN PATENT DOCUMENTS

| | | | | |
|---|---|---|---|---|
| EP | 836185 A2 | * | 4/1998 | |
| JP | 10083622 A | | 3/1998 | |
| JP | 10124990 A | | 5/1998 | |
| JP | 10320876 A | | 12/1998 | |
| JP | 11039787 A | | 2/1999 | |
| JP | 11069707 A | * | 3/1999 | |
| JP | 11086428 A | * | 3/1999 | |
| JP | 11-127563 | | 5/1999 | |
| JP | 11126420 A | | 5/1999 | |
| JP | 11213537 A | | 8/1999 | |
| JP | 11306629 A | * | 11/1999 | |
| JP | 2000003541 A | * | 1/2000 | |
| JP | 2000040281 A | * | 2/2000 | |
| JP | 2000-132892 | | 5/2000 | |
| JP | 2000132904 A | * | 5/2000 | |
| JP | 2000207820 A | | 7/2000 | |
| JP | 2000215568 A | * | 8/2000 | |
| JP | 2000268487 A | * | 9/2000 | |
| WO | WO 9916070 A1 | * | 4/1999 | |

* cited by examiner

DISK PLAYER, AND SELF-COMPENSATING-DYNAMIC-BALANCER (SCDB) INTEGRATED TURNTABLE, SCDB INTEGRATED CLAMPER AND SCDB INTEGRATED SPINDLE MOTOR EMPLOYED IN THE SAME

CROSS REFERENCE TO RELATED APPLICATIONS

This is a divisional of application Ser. No. 09/955,046 filed Sep. 19, 2001, now U.S. Pat, No. 6,731,588, and claims the benefit of Korean Application No. 2000-79735 filed Dec. 21, 2000, in the Korean Patent Office, the disclosures of which are incorporated herein by reference.

BACKGROUND OF THE INVENTION

1. Field of the Invention

The present invention relates to a disk player, a turntable, a clamper and a spindle motor which are employed in the disk player, and more particularly, to a disk player provided with a self-compensating dynamic balancer so that internal vibrations due to eccentric mass of a disk can be limited, a self-compensating-dynamic-balancer integrated turntable, a self-compensating-dynamic-balancer integrated clamper, and a self-compensating-dynamic-balancer integrated spindle motor which are employed in the disk player.

2. Description of the Related Art

In general, a disk player is an apparatus for recording information on a recording medium such as a compact disk (CD), a CD-ROM, or a digital versatile disk (DVD), or reproducing information recorded from the recording medium. The disk and an optical pickup are required to be protected against external impact and internal vibrations.

A conventional disk player is shown in FIG. 1. A deck base 10 is hinged to a housing (not shown) to pivot in a vertical direction and a deck plate 20 is attached to the deck base 10. A spindle motor 21, installed at the deck plate 20 to provide a rotational force for a disk 1, has a turntable 23 fixed to a shaft 22 of the spindle motor 21. A disk 1 is placed on the turntable 23. A clamper 40 is installed at the upper inner surface of the housing to face the turntable 23 for clamping the disk 1 on the turntable 23, and an optical pickup 25 is installed at the deck plate 20 to be movable in a radial direction of the disk 1 for performing recording and reproducing operations. The disk player is provided with damper members 30 installed between the deck base 10 and the deck plate 20 so that external vibrations transferred via the deck base 10 are not transferred directly to the deck plate 20, the spindle motor 21 and the optical pickup 25. The damper members 30 are made of a material not having a high strength, such as a soft rubber or polyurethane, so as to absorb external impacts well.

The disk player of FIG. 1 protects the disk 1 and the optical pickup 25 from external impact by employing the damper members 30. However, the disk player of FIG. 1 includes no measures for reducing internal vibrations occurring due to an eccentric mass of the disk 1 where the spindle motor 21 rotates. Here, the eccentric mass of the disk is produced by variations in a manufacturing process of the disk 1. The eccentric mass causes whirling, that is, the revolution of the rotation axis of the spindle motor due to a disparity between the center of rotation of the disk 1 and the center of mass of the disk.

The influence of whirling on the spindle motor 21 is not significant in a low-speed model, such as a base- or a dual-speed model, but the whirling influence is so serious in a high speed model, such as a six-speed or eight-speed model, that recording/reproduction of information can be difficult. To compensate for the whirling influence in a conventional high speed disk player, a deck plate at which a spindle motor is installed is made to have a greater mass, or the damper members are made stronger so that undesirable movement of a deck plate due to an eccentric mass of a disk is reduced.

The effect on whirling of increasing the mass of the deck plate is insignificant where the disk player operates at a high speed. Additionally, an increase in mass increases manufacturing cost, and limits compactness of the disk player. Where the damper members strength is increased, the damper members do not effectively block vibrations and impact transferred from outside the disk player.

SUMMARY OF THE INVENTION

To solve the above problems, it is a first object of the present invention to provide a disk player which limits internal vibrations due to eccentric mass of a disk without increasing the mass of the disk player and which reduces an influence of external vibrations.

It is a second object of the present invention to provide a self-compensating-dynamic-balancer integrated turntable employable in a disk player to limit internal vibrations due to eccentric mass of a disk.

It is a third object of the present invention to provide a self-compensating-dynamic-balancer integrated clamper employable in a disk player to limit internal vibrations due to eccentric mass of a disk.

It is a fourth object of the present invention to provide a self-compensating-dynamic-balancer integrated spindle motor employable in a disk player to limit internal vibrations due to eccentric mass of a disk.

Additional objects and advantages of the invention will be set forth in part in the description which follows, and, in part, will be obvious from the description, or may be learned by practice of the invention.

Accordingly, to achieve the first and other objects, there is provided a disk player comprising: a deck base; a deck plate elastically attached to the deck base; damper members interposed between the deck base and the deck plate so that the deck plate can be protected from external impact; a spindle motor installed at the deck plate for providing rotational force to a disk; a turntable which is installed on the rotation shaft of the spindle motor, and on which the disk is placed; a clamper for clamping the disk placed on the turntable; an optical pickup installed on the deck plate for recording and/or reproducing information on/from the disk; and a self-compensating dynamic balancer which is installed in a cavity provided in at least one rotating member and the center of mass thereof is disposed at a position opposite the center of mass of the disk with respect to the rotation shaft of the spindle motor due to respective centrifugal forces where the disk rotates, wherein external vibrations are prevented from being transferred to the deck plate by the damper members, and internal vibrations generated by an eccentric center of mass of the disk are limited by the self-compensating dynamic balancer.

To achieve the second and other objects, there is provided a self-compensating-dynamic-balancer integrated turntable for a disk player comprising: a cylindrical turntable main body fixed to the rotation shaft of a spindle motor and provided with a cavity therein; movable members movably disposed in the cavity; and a cover member joined to an opening of the main body so as to cover the main body, and provided with an engagement projection on the upper surface thereof to which the center hole of the disk is fitted so that the disk can be seated thereon.

To achieve the third and other objects, there is provided a self-compensating-dynamic-balancer integrated clamper for a disk player comprising: a cylindrical clamper main body installed on a deck base to be rotated by a rotational force of a spindle motor, and provided with a cavity; a pressing member installed at the clamper main body for pressing a disk placed on a turntable; movable members movably disposed in the cavity of the clamper main body; and a cover member joined to an opening of the main body for covering the cavity.

To achieve the fourth and other objects, there is provided a self-compensating-dynamic-balancer integrated spindle motor for a disk player comprising: a motor base to be screwed to a deck plate; a stator fixed to the motor base; a rotor installed to be rotatable with respect to the stator; a cylindrical case attached to the rotor to form a cavity therebetween, and movable members movably disposed in the case.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
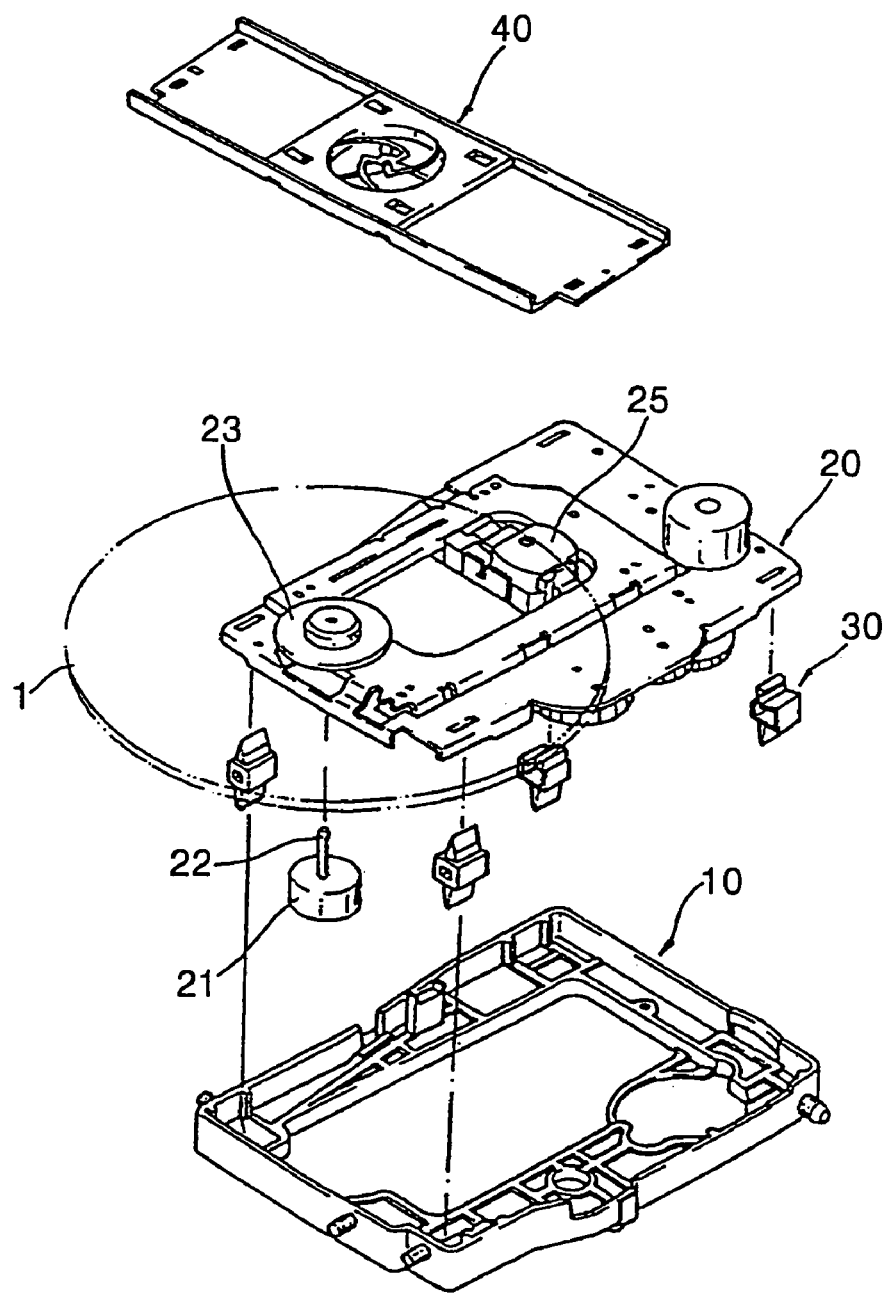
FIG. 1 is an exploded perspective view illustrating a conventional disk player.

Reference will now be made in detail to the present embodiments of the present invention, examples of which are illustrated in the accompanying drawings, wherein like reference numerals refer to like elements throughout.

Figure 2:
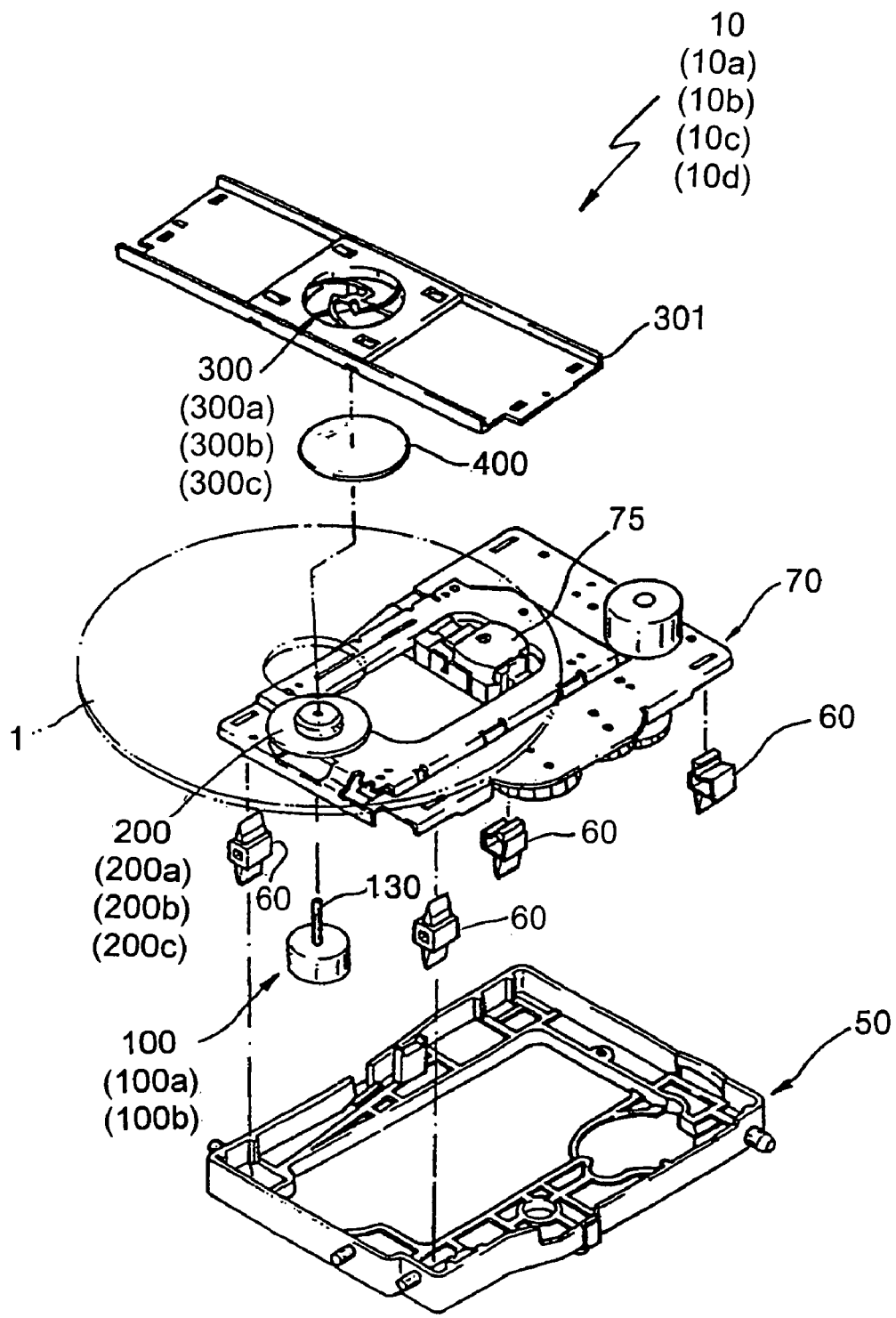
FIG. 2 is an exploded perspective view schematically illustrating a disk player according to the present invention.

As shown in FIG. 2, a disk player 10 according to a first embodiment of a self-compensating-dynamic-balancer-disk player of the present invention comprises: a deck base 50, a deck plate 70 elastically attached to the deck base 50, damper members 60 interposed between the deck base 50 and the deck plate 70, a spindle motor 100 installed at the deck plate 70, a turntable 200, an optical pickup 75, a clamper 300 installed to face the turntable 200 for clamping a disk 1 placed on the turntable 200, and a self-compensating dynamic balancer (SCDB) 400 for restraining the revolution of the rotation axis of the spindle motor 100 due to eccentric mass of the disk 1.

The deck plate 70 experiences impact which is transferred from outside the disk player 10 via the deck base 50, and which is dampened by the damper members 60. Damper members 60 are preferably made of a material, such as a soft rubber or polyurethane, so as to reduce external vibrations transferred via the deck base 50. Also, the deck plate 70 is preferably light in weight. The spindle motor 100 provides a rotational force for rotating the disk 1. The center of the turntable 200 is fixed to a shaft 130 of the spindle motor 100, and where the disk player 10 is operated, the disk 1 is placed on the turntable 200. The clamper 300, installed on a bracket 301 and facing the spindle motor 100, prevents the disk 1 placed on the turntable 200 from moving freely. The turntable 200 is fixed to the shaft 130, and is rotated by the spindle motor 100, and accordingly the disk 1 and the clamper 300 rotate together with the turntable 200. The positional relations of an eccentric mass of the disk 1, the rotation center of the disk 1 and the center of revolution according to various rotational speeds of the disk 1 will be described with reference to FIGS. 3A through 3C.

Figure 3A:
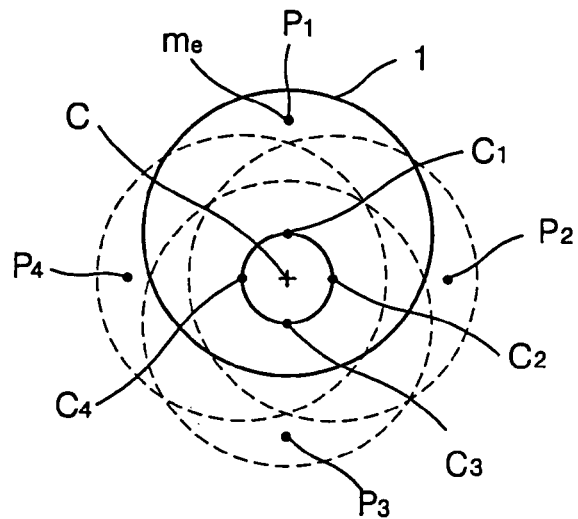
FIGS. 3A, 3B and 3C are schematic diagrams illustrating positional relations of positions of eccentric mass of a disk with positions of a rotation shaft with respect to a revolution center depending on rotational speeds of a disk.

FIG. 3A is a schematic diagram illustrating revolutionary and rotational motions of the disk 1 where a rotational frequency of the spindle motor is less than a natural frequency of the deck plate 70. Here, the natural frequency is determined by the elastic modulus of the damper members 60 and masses of the deck plate 70 and members installed at the deck plate 70, and refers to the natural frequency in a direction parallel to major faces of the disk 1. As shown in FIG. 3A, where an unbalanced mass, that is, an eccentric center of mass $m_e$ of the disk 1 exists at a position $P_1$ spaced a predetermined distance from the rotation center $C_1$ of the disk 1, the rotation center $C_1$ of the disk 1 is displaced to points $C_2$, $C_3$, and $C_4$ in sequence with a revolution center C as a datum point, and revolves about the datum point. The position of the eccentric center of mass me of the disk 1 is displaced to points $P_2$, $P_3$, and $P_4$ in sequence corresponding to the rotation centers $C_2$, $C_3$, and $C_4$. As the disk revolves, the positions $P_1$, $P_2$, $P_3$, and $P_4$ of the eccentric mass $m_e$ of the disk 1 are positioned opposite the revolution center C with respect to the rotation centers $C_1$, $C_2$, $C_3$, and $C_4$ of the disk 1, respectively.

Figure 3B:
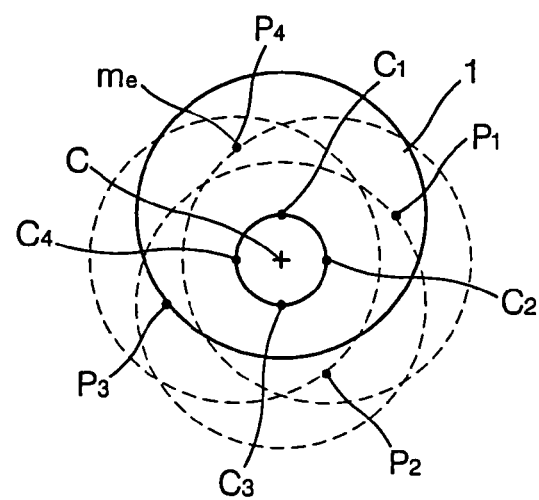

FIG. 3B is a schematic diagram illustrating the revolutionary and rotational motions of the disk 1 where the rotational frequency of the spindle motor 100 is similar to the natural frequency of the deck plate 70. Referring to FIG. 3B, the revolution center C, the rotation center $C_1$ and the position $P_1$ of the eccentric center of mass $m_e$ of the disk 1 form a right angle (C-$C_1$-$P_1$). Likewise, C-$C_2$-$P_2$, C-$C_3$-$P_3$, and C-$C_4$-$P_4$ also form right angles.

Figure 3C:
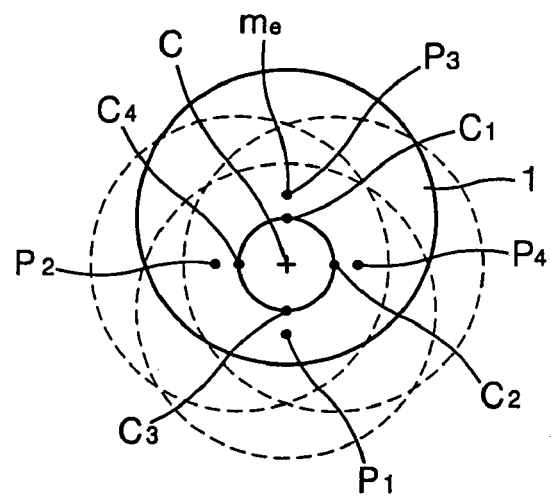

FIG. 3C is a schematic diagram illustrating the revolutionary and rotational motions of the disk 1 where the rotational frequency of the spindle motor 100 is larger than the natural frequency of the deck plate 70. The normal rotation speed of the disk enabling information to be written/reproduced onto/from the disk 1 falls into this case, and the positions $P_1$, $P_2$, $P_3$ and $P_4$ of the eccentric center of mass $m_e$ of the disk 1 and the revolution center C with respect to the rotation centers $C_1$, $C_2$, $C_3$, and $C_4$ of the disk 1, respectively, are points along straight lines $P_1$-C-$C_1$, $P_2$-C-$C_2$, $P_3$-C-$C_3$ and $P_4$-C-$C_4$, respectively.

As described above, the present invention is characterized in that the self-compensating dynamic balancer 400 (FIG. 2) is provided so as to compensate for dynamic unbalance of a disk by using the relationship between the revolution center of the disk 1 and the eccentric center of mass of the disk 1.

The self-compensating dynamic balancer 400 is incorporated into at least any one rotating member of the disk drive, such as for example, the spindle motor 100, the rotation shaft 130, the turntable 200 and the clamper 300, wherein the at least one rotating member is rotated by the rotational force supplied by the spindle motor 100. For exemplary embodiments of the self-compensating-dynamic-balancer 400 incorporated into the various components of the disk player, see descriptions of spindle motors 100a and 100b; turntables 200a, 200b and 200c; and clampers 300a, 300b and 300c, which are set forth below.

Figure 4:
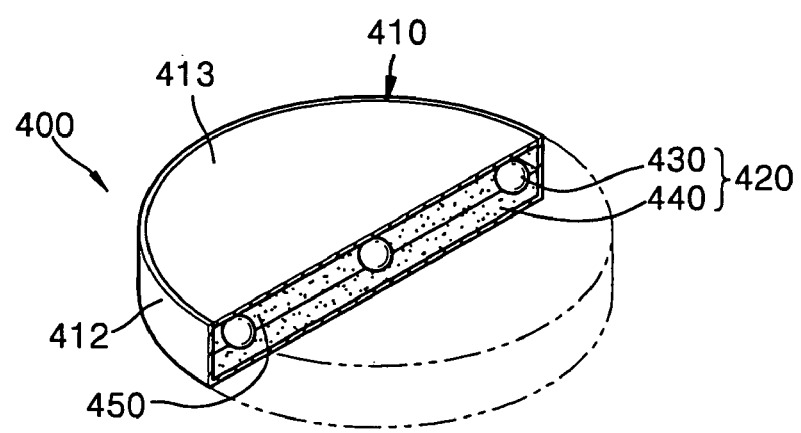
FIG. 4 is a cut-away perspective view illustrating an embodiment of a self-compensating balancer employed in a disk player according to the present invention.

As shown in FIG. 4, a first embodiment of the self-compensating dynamic balancer 400 comprises a cylindrical case 410 provided with a cavity 450, and movable members 420 disposed in the cavity 450. The case 410 comprises a main body 412 and a cover member 413. The cover member 413 is attached to the main body 412 using an adhesive, pairs of grooves and protrusions formed at corresponding positions, screws or other attachment apparatus or methods. Since a suitable attachment apparatus and methods are well-known, detailed descriptions thereof will be omitted.

The movable members 420 are free to move away from the rotation center according to respective centrifugal forces thereon where the case 410 rotates. The movable members 420 comprise one of a plurality of rigid bodies 430, a fluid 440 such as a liquid, and a plurality of rigid bodies 430 and the fluid 440. The movable members 420 function as a migrating mass having a movable mass center which shifts under the influence of the centrifugal forces to compensate for the eccentric mass $m_e$ of the disk 1 and the migrating mass rotates synchronously with the disk 1 to attenuate vibrations induced by the eccentric center of mass $m_e$ of the disk 1.

Figure 5:
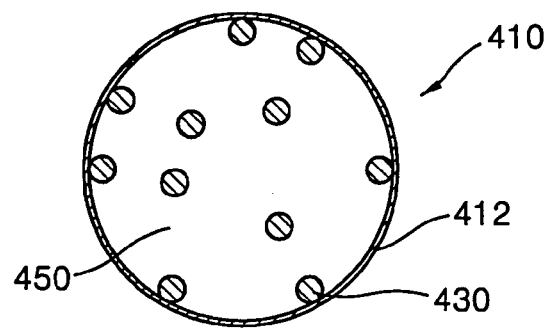
FIG. 5 is a schematic sectional view of FIG. 4 where rigid bodies are employed as movable members.

FIG. 5 shows an example of the self-compensating dynamic balancer 400 comprising the plurality of rigid bodies 430 disposed in the cavity 450 of the case 410 as the movable members 420. The rigid bodies 430 are installed to roll or slide freely so that positions of the rigid bodies are determined by respective centrifugal forces where the case 410 rotates.

Figure 6:
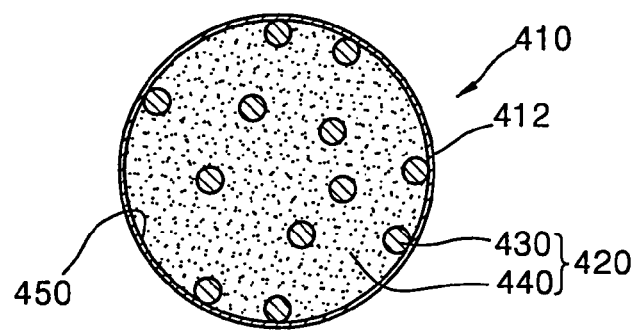
FIG. 6 is a schematic sectional view of FIG. 4 where rigid bodies and a fluid are employed as movable members.

FIG. 6 shows another example of a self-compensating dynamic balancer 400 in which the movable members 420 comprise the plurality of rigid bodies 430 and the fluid 440. Since the fluid 440 has a larger contacting area with the main body 412 and the cover member 413 than the rigid bodies 430, the eccentric center mass of the disk 1 (FIG. 2) which causes internal vibrations is more effectively compensated. That is, the fluid 440 reduces friction between the rigid bodies 430 and inner walls of the case 410 and exerts damping forces against the rigid bodies 430, thus, retarding the rigid bodies 430 from moving violently before the rigid bodies 430 find their balanced positions. Most of the revolution of the rotation shaft 130 due to the eccentric center of mass of the disk 1 (FIG. 2) is removed by movements of the rigid bodies 430, and fine compensation of the revolution is provided by movement of the fluid 440.

An amount of fluid 440 may be just enough to provide a coating of about several-μm thickness on each rigid body 430. In this case, the fluid 440 serves as a lubricant to reduce friction between the rigid bodies 430 and the inner walls of the case 410, and to give the rigid bodies 430 a damping effect instead of taking a substantial part in a balancing operation.

FIGS. 7 through 10 are partially cut-away perspective views illustrating various exemplary shapes of embodiments of the rigid body 430 which may be employed within the cavity 450 of the case 410.

Figure 7:
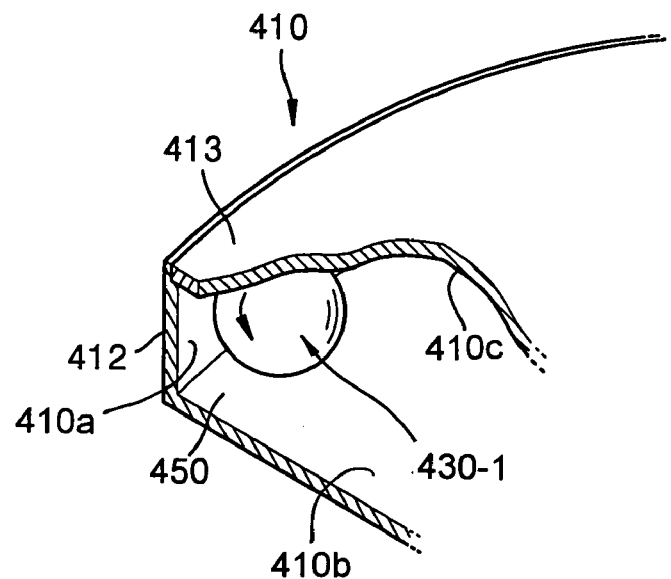
FIGS. 7, 8 and 9 are perspective views each showing a portion of a self-compensating balancer and illustrating rigid body shapes of spherical, cylindrical and conical, respectively, employed as the movable members.

FIG. 7 is a partially cut-away perspective view illustrating the rigid body 430 as a spherical shaped rigid body 430-1.

Figure 8:
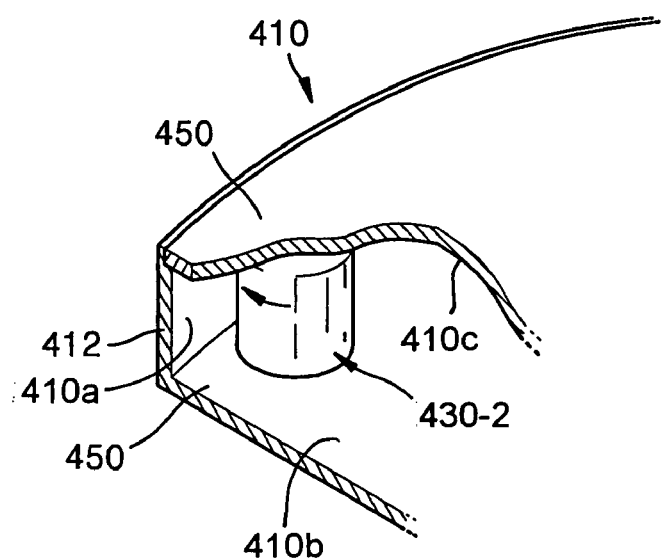
Figure 14:
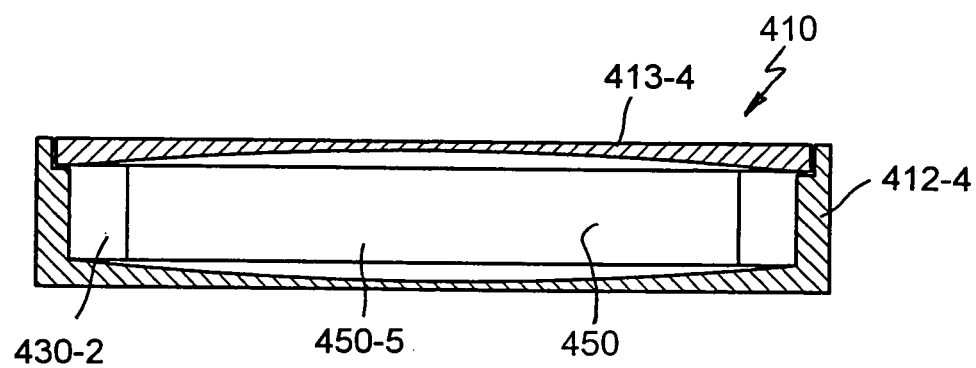
FIG. 14 is a sectional view illustrating a diametrical section of a cavity of a self-compensating dynamic balancer wherein the section has opposing sides of an elliptical shape.

FIG. 8 is a partially cut-away perspective view illustrating the rigid body 430 as a cylindrical shaped rigid body 430-2. The cylindrical rigid body 430-2 is disposed so that the circumferential surface of the cylindrical rigid body 430-2 rolls over an inner wall surface 410a of the case 410. Lower and upper planar surfaces of the cylindrical rigid body 430-2 slide between inner wall surfaces 410b and 410c, thus, there is a possibility of increasing friction between the cylindrical rigid body 430-2 and the case 410. Taking this possibility of increasing friction into consideration, the inner wall surfaces 410b and 410c of the cavity 450 of the case 410 preferably have an elliptical shape as shown in FIG. 14, as will be described more fully below.

Figure 9:
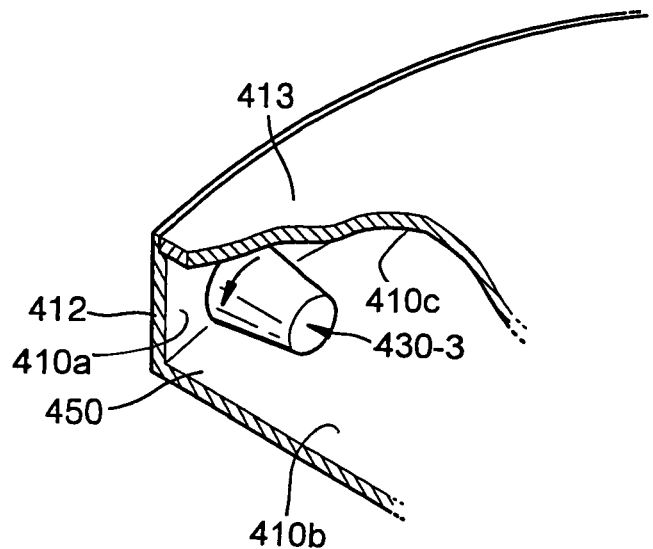

FIG. 9 is a partially cut-away perspective view illustrating the rigid body 430 as a conical frustum shaped rigid body 430-3. The rigid body 430-3 is disposed so that the curved circumferential surface thereof rolls between the inner wall surfaces 410b and 410c of the case 410.

Figure 10:
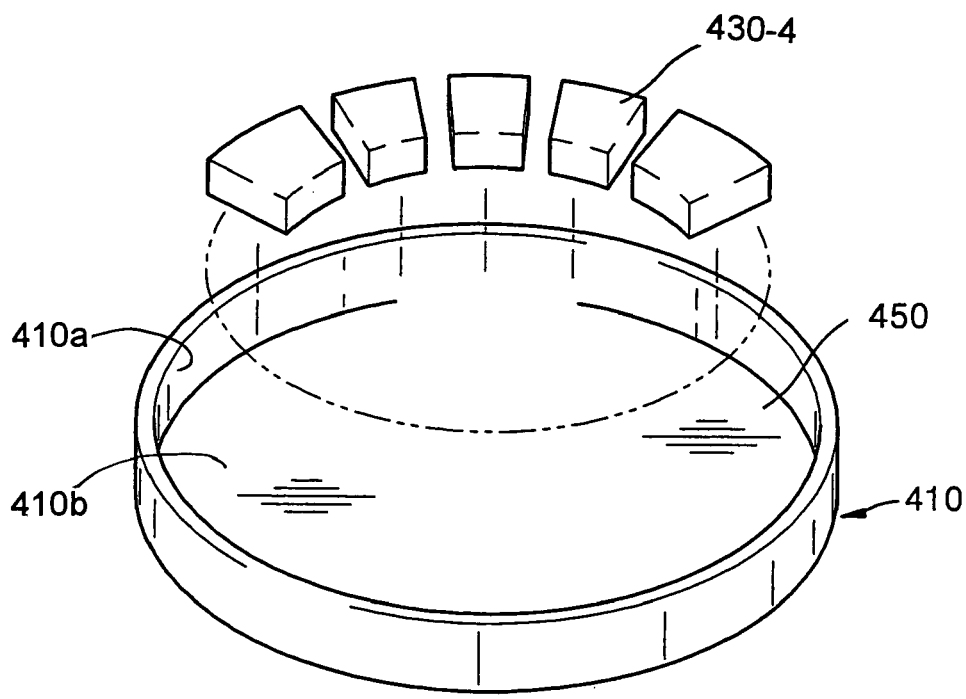
FIG. 10 is an exploded perspective view showing a portion of a self-compensating balancer and illustrating a sectorial pillar shape rigid body employed as the movable members.

FIG. 10 is an exploded perspective view illustrating the rigid body 430 as a sectorial pillar shaped rigid body 430-4. The rigid body 430-4 is inserted so that the rigid body 430-4 slides along the inner wall surfaces 410b and 410c (not shown) and/or along the side wall 410a of the case 410.

Alternatively, the rigid body 430 included in the case 410 may have a shape different from the shapes of the rigid bodies 430-1, 430-2, 430-3 and 430-4 as long as the rigid body 430 is allowed to move freely in the cavity 450 of the case 410.

Since the rigid bodies 430 may not freely move due to interaction between adjacent rigid bodies 430 where the rigid bodies 430 are under influence of a magnetic field, the rigid bodies 430 are preferably made of a non-magnetic material so that the rigid bodies 430 are not influenced by the magnetic field.

Examples of suitable non-magnetic materials for the rigid body 430 include tungsten carbide, a copper-beryllium alloy, Hastelloy C-276, zirconia ($ZrO_2$), an austenitic stainless steel (YHD50), SUS300, SUS304, SUS316, or the like, a ceramic material such as silicon nitride, or a synthetic resin material. In addition, the rigid body 430 may be made of a non-magnetic material such as bronze, brass, or copper, and plated with nickel, chromium or the like by a surface treatment.

Where the rigid body 430 is not influenced by a magnetic field in the vicinity thereof, the rigid body 430 moves depending on the rotations of the rotating members which incorporate the self-compensating-dynamic-balancer 400 and the position of eccentric center of mass $m_e$ of the disk 1 (FIG. 2).

The rigid body 430 is preferably made of an antioxidant material, or coated with an antioxidant material so that the rigid body 430 is prevented from erratically rolling or sliding in the cavity 450 of the case 410 due to oxidation and corrosion of the rigid body 430.

The rigid body 430 may be made of an antioxidant material such as SUS300, a ceramic material, a synthetic resin material, or the like. Alternatively, a carbon steel, or an iron-chromium alloy may be used as a base metal to make the rigid body 430, and the outer surface thereof plated with zinc, nickel and/or chromium for anti-oxidation.

Alternatively, the rigid body 430 may be made of a material whose oxide particle oxidated in air is fine enough to not affect the movement of the rigid body 430. The materials and coatings described for the rigid body 430 are equally applicable to the spherical rigid body 430-1, the cylindrical rigid body 430-2, the conical frustum shaped rigid body 430-3 and the sectorial pillar shaped rigid body 430-4.

Various shapes of the cavity 450 within the case 410 according to embodiments of the main body 412 and the cover member 413 of the case 410 will be described with reference to FIGS. 11 through 14.

Figure 11:
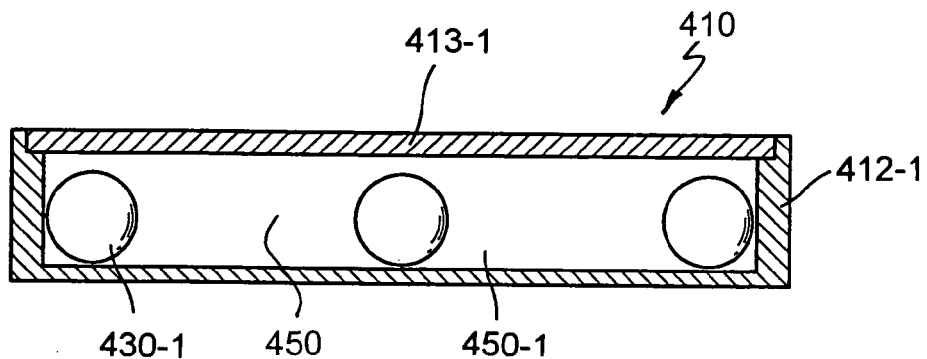
FIG. 11 is a sectional view illustrating a diametrical section of a cavity of a self compensating dynamic balancer wherein the section has a rectangular shape.

As shown in FIG. 11, a main body 412-1 and a cover member 413-1 are configured so that a diametrical section of the cavity 450 in which the movable rigid bodies 430-1 are installed has a rectangular shape 450-1.

Figure 12:
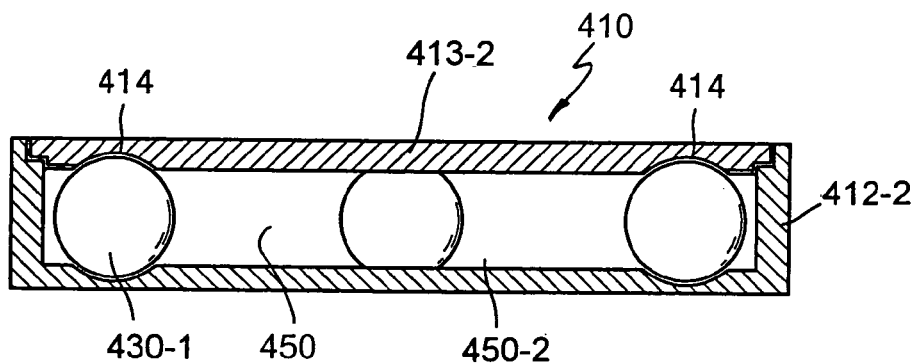
FIG. 12 is a sectional view illustrating a diametrical section of a cavity of a self-compensating dynamic balancer wherein the section has a dumbbell shape.

As shown in FIG. 12, the diametrical section of the cavity 450 may have a dumbbell shape 450-2 formed in a main body 412-2 and a cover member 413-2, wherein the movable rigid body 430-1 moves along a rounded annular portion 414 formed at a peripheral portion of the cavity 450 while being guided by the rounded annular portion 414.

Figure 13A:
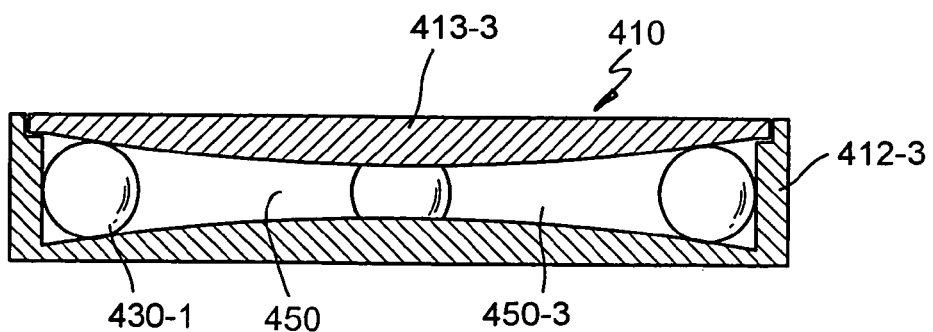
FIG. 13A is a sectional view illustrating a diametrical section of a cavity of a self-compensating dynamic balancer wherein the section has opposing sides with a hyperbolic shape.
Figure 13B:
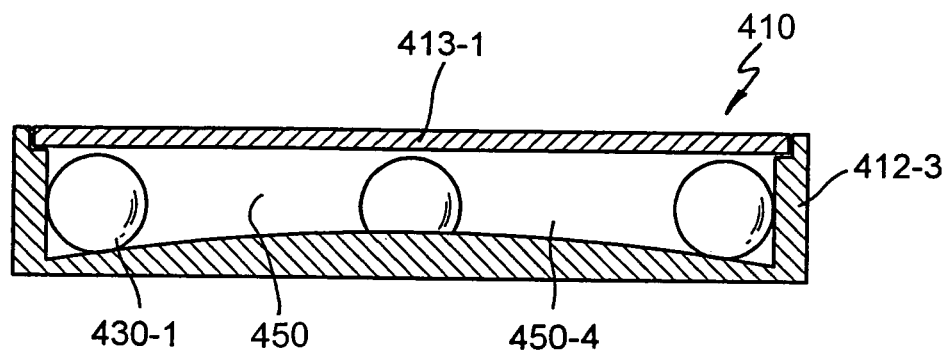
FIG. 13B is a sectional view illustrating a diametrical section of a cavity of a self-compensating dynamic balancer wherein the section has a straight side and an opposing side of a hyperbolic shape.

As shown in FIG. 13A, the diametrical section of the cavity 450 may have a hyperbolic shape 450-3 formed in a main body 412-3 and a cover member 413-3 wherein the cavity 450 has a narrow portion at a center portion of the cavity 450 and gradually widens toward an outer portion of the cavity 450. The hyperbolic shape 450-3 is very advantageous for causing the rigid body 430-1 to move toward the outer portion, and for reducing a contact portion between the rigid body 430-1 and the inner surfaces of the case 410. Alternatively, as shown in FIG. 13B, the diametrical section of the cavity 450 may have a half-hyperbolic shape 450-4 formed in a main body 412-3 and a cover member 413-1 wherein one boundary of the shape 450-4 is one branch of a hyperbola and another boundary of the shape 450-2 is a straight line.

As shown in FIG. 14, the diametrical section of the cavity 450 may have an elliptical shape 450-5 formed in a main body 412-4 and a cover member 413-4 wherein two boundaries of the section are shaped as a portion of an ellipse, and wherein the cavity 450 is wide at a center portion of the cavity 450 and gradually narrows toward outer portions of the cavity 450. In the elliptical shaped cavity, where the rigid body 430-2 (FIG. 10) having a cylindrical shape is employed, sliding movement between the case 410 and the rigid body 430-2 is restrained.

The main body 412 and the cover member 413 of the case 410 are preferably made of non-magnetic materials so as to prevent influence of magnetic forces interacting with the rigid bodies 430. That is, the main body 412 and the cover member 413 may be made of non-magnetic metallic materials such as tungsten carbide, a copper-beryllium alloy, Hastelloy C-276, zirconia ($ZrO_2$), brass, an austenitic stainless steel (YHD50), SUS300, SUS304, SUS316, or the like, a ceramic material such as silicon nitride, or a synthetic resin material.

Also, the main body 412 is preferably made of an antioxidant material or is coated with an antioxidant material. Suitable antioxidant materials include SUS 300, a ceramic material, a synthetic resin material, or the like. The antioxidant coating is formed by plating with a thin layer of zinc, nickel or chromium, or the like on a base metal such as a carbon steel, or an iron-chromium alloy. The materials and coatings described for the main body 412 and the cover member 413 are also applicable to the main bodies 412-1, 412-2, 412-3, and 412-4 and the cover members 413-1, 413-2, 413-3 and 413-4.

A first embodiment 200a of a self-compensating-dynamic-balancer integrated turntable according to the present invention will be described with reference to FIGS. 15 and 16

Figure 15:
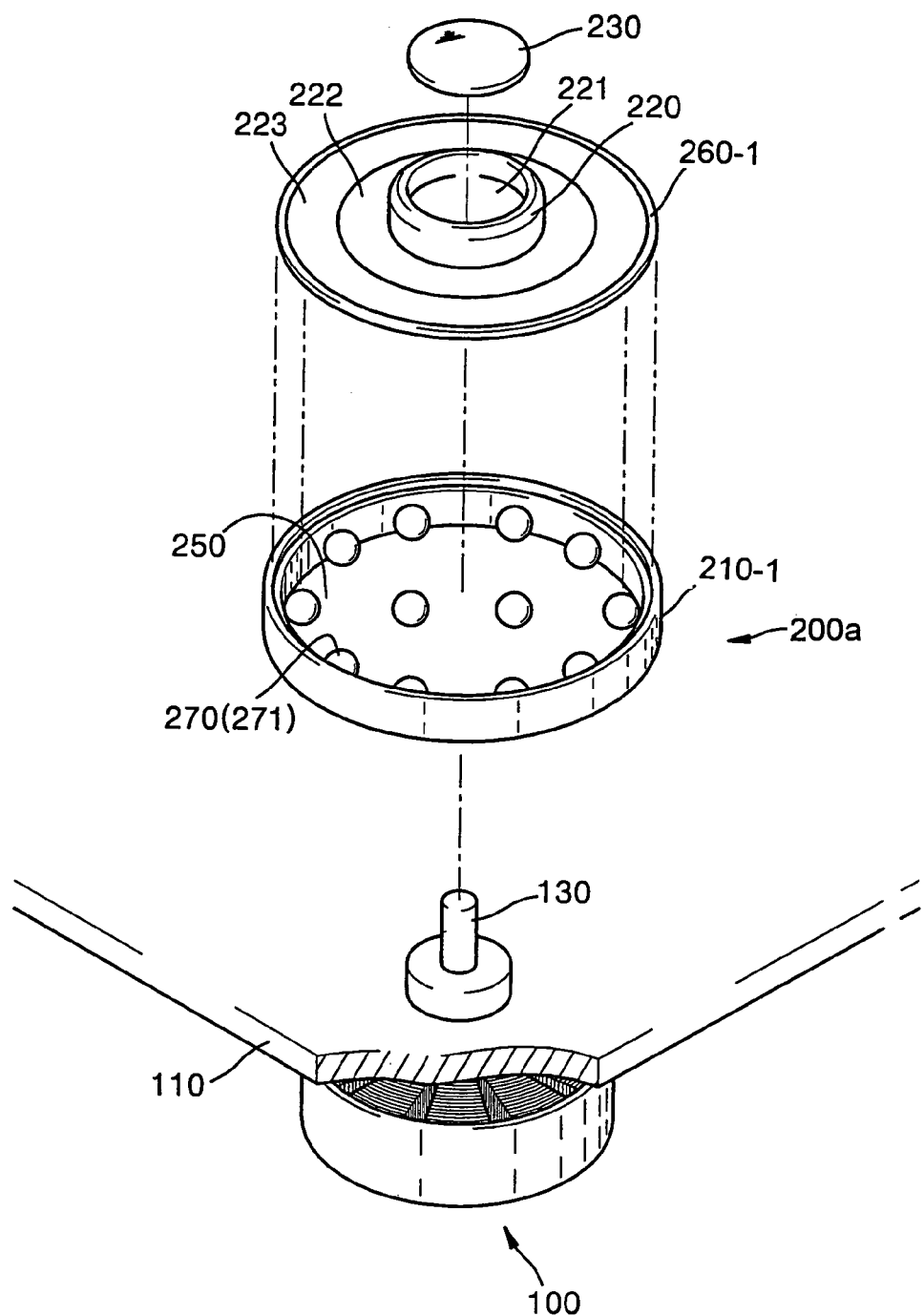
FIG. 15 is an exploded perspective view illustrating a first embodiment of a self-compensating-dynamic-balancer integrated turntable for a disk player according to the present invention.
Figure 16:
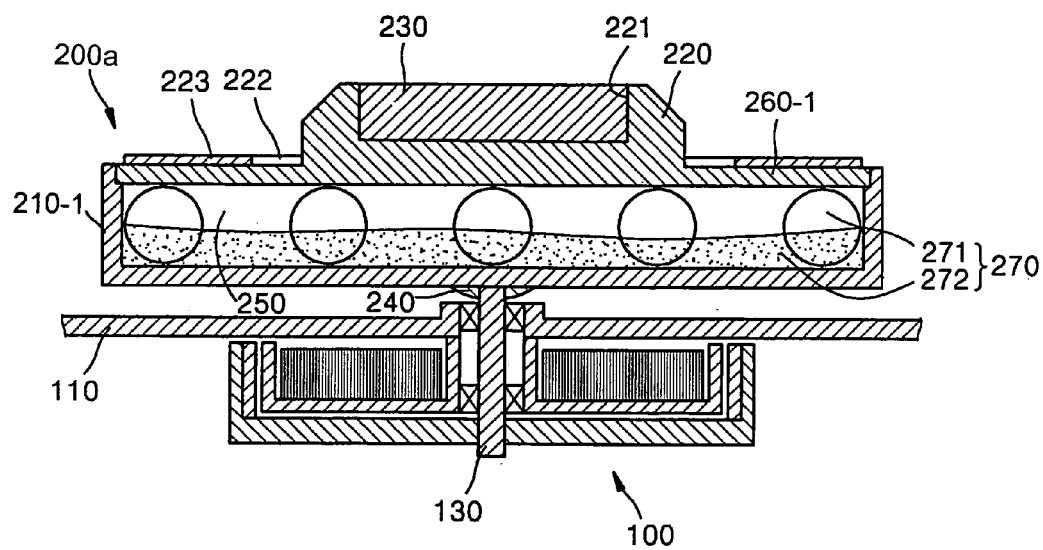
FIG. 16 is a sectional view of the self-compensating-dynamic-balancer integrated turntable illustrated in FIG. 15, wherein rigid bodies and a fluid are employed as movable members.

Referring now to FIGS. 15 and 16, a cylindrical main body 210-1 of the turntable 200a is fixed to the rotation shaft 130 of a spindle motor 100, which is installed through a motor base 110. A boss 240 is formed at a lower surface of the main body 210-1 and the rotation shaft 130 is inserted into the boss 240. Movable members 270 are disposed in a cavity 250 of the main body 210-1 so that the movable members 270 are free to move away from a rotation center of the main body 210-1 according to respective centrifugal forces developed where the turntable 200a rotates. The cavity 250 is sealed by assembling a cover member 260-1 enclosing the movable members 270 in the cavity 250. An engagement projection 220 is formed on an upper surface of the cover member 260-1 to receive a center opening of the disk 1.

The cover member 260-1 is attached to the main body 210-1 by using an adhesive, pairs of grooves and protrusions formed at corresponding positions, screws or the like. Since attachment methods are well-known, detailed descriptions thereof will be omitted. The upper opening of the main body 210-1 may be formed over the whole surface of the main body 210-1, as shown in FIGS. 15 and 16, or the upper opening may be formed at a portion of the upper surface of the main body 210-1 to have dimensions that allow the movable members 270 to pass through.

On the upper surface of the cover member 260-1, a disk-seat surface 222 is provided to have a flat surface so that the disk-seat surface 222 makes surface contact with the disk 1 (FIG. 2) where the disk 1 is received on the engagement projection 220. A friction member 223 aids the disk-seat surface 222 to prevent the disk 1 from idly rotating by increasing frictional force between the cover member 260-1 and the disk 1.

Preferably, the turntable 200a comprises a magnet 230 so that the disk 1 (FIG. 2) is retained on the disk-seat surface 222 due to magnetic interaction between the magnet 230 and the clamper 300 (FIG. 2). The magnet 230 is inserted in an installation hole 221 formed at the engagement projection 220.

The movable members 270 comprise one of a plurality of the rigid bodies 271, a fluid 272 such as a liquid, and the plurality of rigid bodies 271 and the fluid 272. The movable members 270 move away from the rotation center of the shaft 130 according to respective centrifugal forces developed where the main body 210-1 rotates.

FIG. 15 is an exploded perspective view illustrating an example in which the movable members 270 comprise a plurality of rigid bodies 271 which are contained in the cavity 250. The rigid bodies 271 are installed to freely roll or slide in the cavity 250 so that the positions of the rigid bodies 271 are determined by respective centrifugal forces developed where the main body 210-1 rotates.

The rigid 271 is constructed as one of a sphere shaped rigid body 430-1, cylindrical shaped rigid body 430-2, conical frustum shaped rigid body 430-3, sectorial pillar shaped rigid body 430-4, or the like according to various embodiments thereof. The shape of the rigid body 271 may be changed to another shape as long as the rigid body 271 freely moves in the cavity 250.

A fluid 272 may be included so that the movable members 270 comprise the fluid 272 and the rigid bodies 271. Since the fluid 272 has a greater contacting area with the main body 210-1 and the cover member 260-1 than the rigid bodies 271, where the fluid 272 is used in the cavity 250 together with the rigid bodies 271, the eccentric center of mass of the disk 1 (FIG. 2), which causes vibrations internal to the disk drive, is more effectively compensated.

Here, an amount of fluid 272 may be just enough to provide a coating of about several-μm thickness on each rigid body 271. In this case, the fluid 272 serves as a lubricant to reduce friction between the rigid bodies 271 and the inner surfaces of the main body 210-1 and the cover member 260-1 instead of a substantial part in a balancing operation.

Since the rigid bodies 271 may not roll well due to interaction between adjacent rigid bodies 271, where the rigid bodies 271 are under the influence of a magnetic field, it is preferable that the rigid bodies 271 are made of a non-magnetic material so that the rigid bodies 271 are not influenced by the magnetic field of the magnet 230. Thus, the rigid bodies 271 move smoothly, according to the rotation of the turntable 200a and the position of eccentric center of mass of the disk 1 (FIG. 2).

Preferably, the rigid body 271 is made of an antioxidant material, or coated with an antioxidant material so that the rigid body 271 is prevented from erratically rolling or sliding in the cavity 250 due to oxidation and corrosion of the rigid body 271. The anti-oxidation coating is formed by plating the rigid body 271 with a thin layer of zinc, nickel and/or chromium on a base metal such as a carbon steel, or an iron-chromium alloy. In addition, the rigid body 271 may be made of a material whose oxide particle oxidated in air is sufficiently fine to not affect the movement of the rigid body 271.

The fluid 272 may be employed as the movable members 270 without employing the rigid bodies 271. In this case, the cavity 250 is sealed with the cover member 260-1 so that the fluid 272 does not leak out.

A shape of a diametrical section of the cavity 250 formed by the main body 210-1 and the cover member 260-1 may be one of the shapes described above with reference to the self compensating balancer 400, that is, a rectangular shape 450-1, a dumbbell shape 450-2, a hyperbolic shape 450-3, a half-hyperbolic shape 450-3, or an elliptical shape 450-4, as shown in FIGS. 11 through 14.

Preferably, the main body 210-1 and the cover member 260-1 are made of non-magnetic materials so as to prevent the influence of magnetic forces interacting with the rigid bodies 271. That is, the main body 210-1 and the cover member 260-1 may be made of non-magnetic metallic materials such as tungsten carbide, a copper-beryllium alloy, Hastelloy C-276, zirconia ($ZrO_2$), brass, aluminum, an austenitic stainless steel (YHD50), SUS300, SUS304, SUS316, or the like, a ceramic material such as silicon nitride, or a synthetic resin material. In addition, the rigid body 271 may be made of a non-magnetic material such as bronze, brass, or copper, and, then, be plated with nickel, chromium and/or the like as a surface treatment.

Also, the main body 210-1 is preferably made of an antioxidant material or is coated with an antioxidant material. The antioxidant material includes SUS 300, a ceramic material, a synthetic resin material, or the like. The antioxidant coating is formed by plating a thin layer of zinc, nickel and chromium, or the like on a base metal such as a carbon steel, or a iron-chromium alloy.

Figure 17:
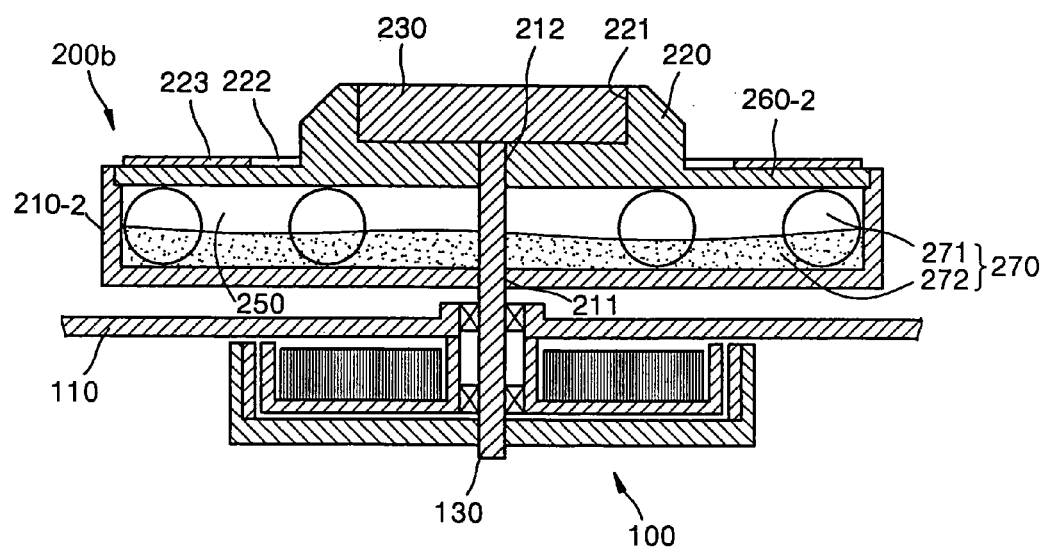
FIG. 17 is a sectional view illustrating a second embodiment of a self-compensating-dynamic-balancer integrated turntable for a disk player according to the present invention.

A second embodiment 200b of a self-compensating-dynamic-balancer integrated turntable according to the present invention will be described with reference to FIG. 17. The second embodiment 200b is similarly constructed as the first embodiment 200a of the self-compensating-dynamic balancer integrated turntable.

In the second embodiment 200b, the rotation shaft 130 of a spindle motor 100 is inserted through an engagement hole 211 formed through a main body 210-2 of the turntable 200b, and is fixed in an upper hole 212 of a cover member 260-2 after traversing the cavity 250. However, since the movable members 270 move toward peripheral portions of the turntable 200a due to respective centrifugal forces where the turntable 200a rotates, the rotation shaft 130 does not interfere with movements of the movable members 270.

Figure 18:
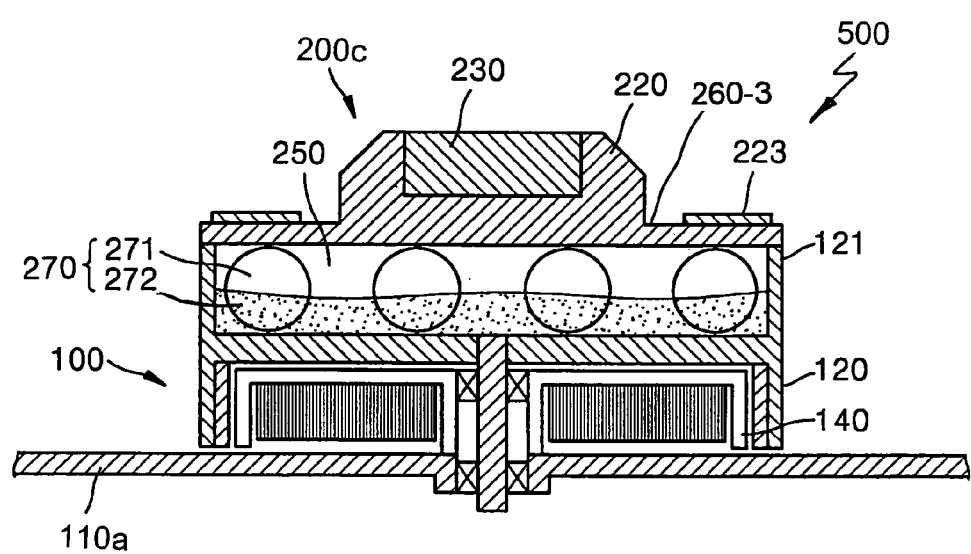
FIG. 18 is a sectional view illustrating a third embodiment of a self-compensating-dynamic-balancer integrated turntable for a disk player according to the present invention.

FIG. 18 illustrates a third embodiment 200c of a self-compensating-dynamic-balancer integrated turntable according to the present invention. In the third embodiment 200c of the self-compensating-dynamic-balancer integrated turntable of the present invention, a turntable main body 210-2 is not separately provided as shown in FIG. 17. In the self-compensating-dynamic-balancer integrated turntable 200c, the cavity 250 which encloses the movable members 270 is incorporated integral with a rotor 120 of a spindle motor 100. The spindle motor 100 comprises a stator 140 and the rotor 120. The spindle motor 100 is installed on a motor base 110a, which is different from the first and second embodiments, 200a and 200b, respectively. A rim portion 121 is provided at the rotor 120 to form the cavity 250 which encloses the movable members 270. In this manner, a self-compensating-dynamic-balancer integrated turntable is realized without preparing a separate main body of a turntable. Examples of the movable members 270 and examples of a sectional shape of the cavity 250 are the same as those of the first and second embodiments 200a and 200b of the self-compensating-dynamic-balancer integrated turntable. FIG. 18 also illustrates an embodiment of a self-compensating-dynamic-balancer integrated spindle motor turntable 500 where the self-compensating-dynamic-balancer turntable 200c is integrated into the rotor of the spindle motor 100.

Although the first, second and third embodiments of the self-compensating-dynamic-balancer integrated turntable are illustrated by incorporating the self-compensating-dynamic-balancer shown in FIG. 11, it will be readily appreciated by those skilled in the art that the scope of the invention includes incorporating any of the self-compensating-dynamic-balancers described above with reference to FIGS. 4 through 14 as a self-compensating-dynamic-balancer member of the self-compensating-dynamic-balancer integrated turntables 200a, 200b and 200c.

A self-compensating-dynamic-balancer integrated clamper 300a according to embodiments of the present invention will be described in detail with reference to FIGS. 19 through 22.

As shown in FIG. 2, a self-compensating-dynamic-balancer integrated clamper 300a of the present invention is positioned by a bracket 301 to hold a disk 1 seated on a turntable 200 (FIG. 2). The bracket 301 is fixed to a deck base 50 by other structure (not shown).

Figure 19:
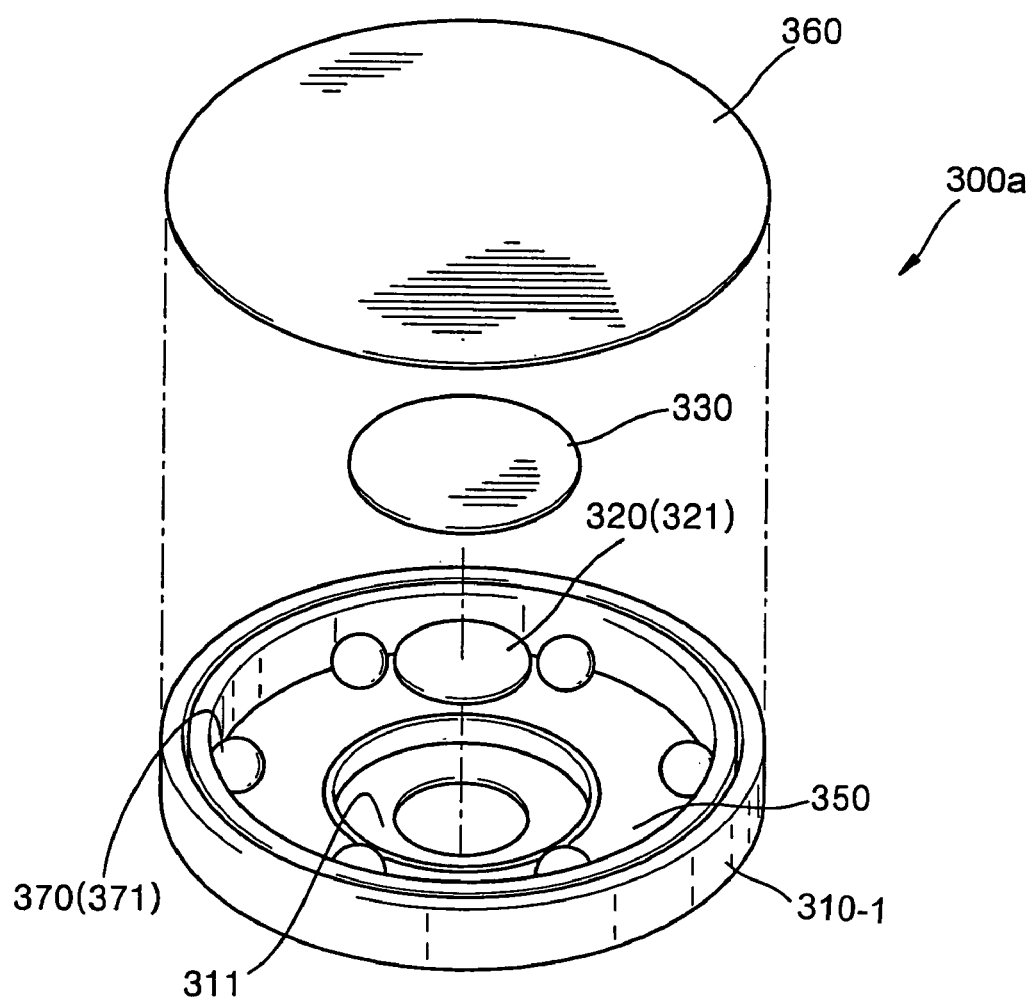
FIG. 19 is an exploded perspective view illustrating a first embodiment of a self-compensating-dynamic-balancer integrated clamper for a disk player according to the present invention.
Figure 20:
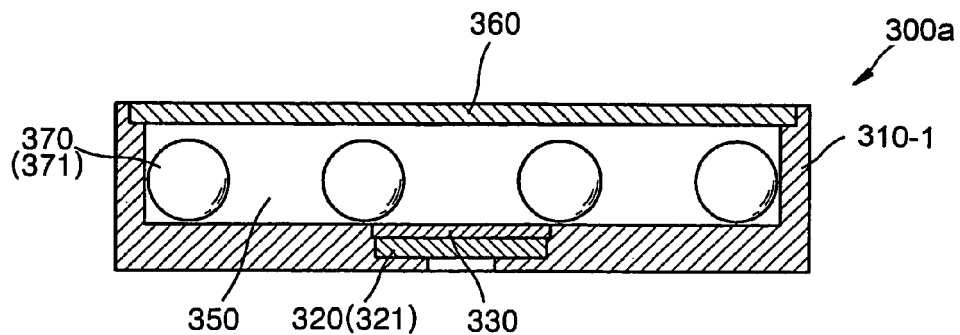
FIG. 20 is a sectional view of the self-compensating-dynamic-balancer integrated clamper illustrated in FIG. 19, wherein a yoke is employed as a pressing member.

Referring to FIGS. 19 and 20, a first embodiment of a self-compensating-dynamic-balancer integrated clamper 300a according to the present invention comprises a cylindrical clamper main body 310-1 provided with a cavity 350, a pressing member 320, an intermediate cover member 330, movable members 370, and a cover member 360. The pressing member 320 is installed in a receiving hole 311 formed at the clamper main body 310-1 to press a disk 1 (FIG. 2) seated on the turntable 200 (FIG. 2). The intermediate cover member 330 blocks the receiving hole 311 after the pressing member 320 is installed. The movable members 370 are disposed in the cavity 350, and move toward peripheral portions of the cavity 350 according to respective centrifugal forces where the clamper main body 310-1 rotates. The cover member 360 covers an opening of the clamper main body 310-1 to enclose the cavity 350.

The intermediate cover member 330 and the cover member 360 are fixed to the damper main body 310-1 by using an adhesive, grooves and projections formed at corresponding positions, respectively, or screws. Since such fixing methods are well-known, detailed descriptions thereof will be omitted.

The opening of the clamper main body 310-1 may be formed over the whole upper portion of the main body 310, as shown in FIGS. 19 and 20, or may be formed at a portion thereof to have dimensions that enable insertion of the movable members 370 therethrough. Alternatively, the pressing member 320 may be a yoke member 321.

Where a magnet 230 is provided on the turntable 200 (FIG. 2), in a similar manner as shown for turntables 200a, 200b and 200c as shown in FIGS. 15 through 18, the yoke member 321 presses against the disk 1 (FIG. 2) due to interaction between the yoke member 321 and the magnet 230.

Figure 21:
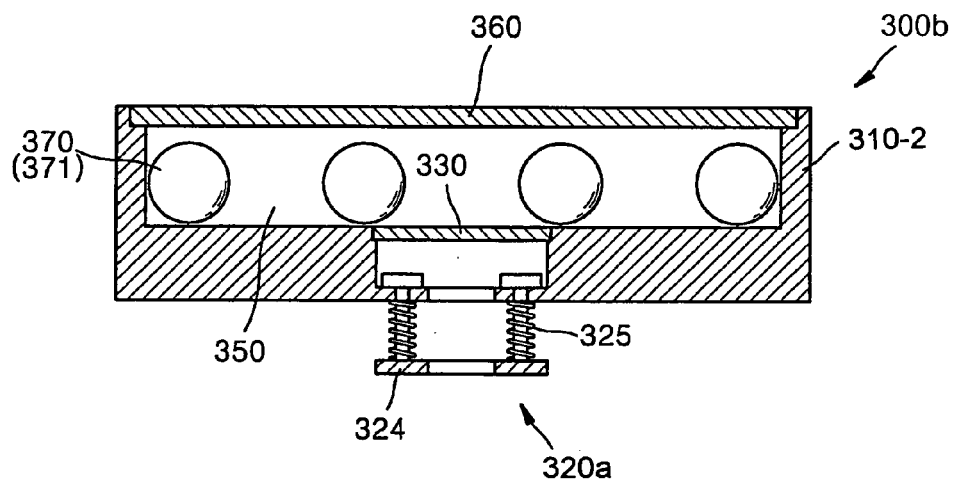
FIG. 21 is a sectional view of the self-compensating-dynamic-balancer integrated clamper illustrated in FIG. 19, wherein an elastic member is employed as a pressing member.

A second embodiment 300b of a self-compensating-dynamic-balancer integrated clamper of the present invention is shown in FIG. 21. In the second embodiment 300b, a pressing member 320a performs a similar function as pressing member 320. The pressing member 320a comprises a pressing plate 324 and an elastic member 325. The pressing plate 324 is installed under a lower surface of a clamper main body 310-2 to be movable vertically. The elastic member 325 is interposed between the clamper main body 310-2 and the pressing plate 324 so that the pressing plate 324 elastically presses the disk 1 (FIG. 2). Thus, where the clamper main body 310-2 approaches the turntable 200, the pressing member 320a holds the disk 1 placed on the turntable 200 and the self-compensating-dynamic-balancer integrated clamper 300b rotates together with the turntable 200.

In the embodiments shown in FIGS. 20 and 21, the movable members 370 comprise a plurality of rigid bodies 371 which are radially movable away from the rotation center of the clamper main body 310-1 (310-2) within the cavity 350 according to respective centrifugal forces where the clamper main body 310-1 (310-2) rotates.

FIGS. 19 through 21 show examples of a self-compensating-dynamic-balancer integrated clamper 300a (300b) in which a plurality of rigid bodies 371 are contained in the cavity 350 as the movable members 370. The rigid bodies 371 roll or slide freely so that positions of the rigid bodies are determined by respective centrifugal forces where the main body 310-1 (310-2) rotates.

Preferably, the rigid bodies 371 have one of a spherical shape, a cylindrical shape, a conical frustum shape or a sectorial pillar shape, such as for example the spherical shape 430-1, the cylindrical shape 430-2, the conical frustum shape 430-3, or the sectorial pillar shape 430-4 as described with reference to FIGS. 7, 8, 9 and 10, respectively. However, the shape of the rigid body 371 may be changed to another shape as long as the rigid body 371 is free to move in the cavity 350.

Figure 22:
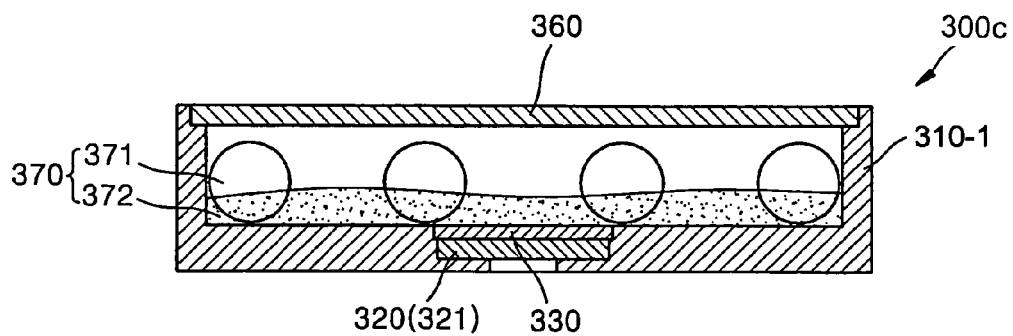
FIG. 22 is a sectional view of the self-compensating-dynamic-balancer integrated clamper illustrated in FIG. 19, wherein rigid bodies and a fluid are employed as movable members.

A third embodiment 300c of a self-compensating-dynamic-balancer integrated clamper according to the present invention is shown in FIG. 22. In the third embodiment 300c, the movable members 370 comprise a fluid 372 and the plurality of the rigid bodies 371. Since the fluid 372 has a greater contacting area with the clamper main body 310-1 and the cover member 360 than the rigid bodies 371, where the fluid 372 is used in the cavity 350 together with the rigid bodies 371, eccentric mass of the disk 1 (FIG. 2) which causes internal vibrations is more effectively compensated.

Preferably, the rigid bodies 371 are made of a non-magnetic material so that the rigid bodies 371 are not influenced by the magnetic field of a magnet 230 (FIG. 15). Where the rigid bodies 371 are non-magnetic, the rigid bodies 371 move depending on the rotation of the clamper main body 310 and the position of the eccentric center of mass of the disk 1 (FIG. 2).

Preferably, the rigid body 371 is made of an antioxidant material, or coated with an antioxidant material so that the rigid body 371 can be prevented from erratically rolling and sliding in the cavity 350 due to oxidation and corrosion of the rigid body 371. Alternatively, the rigid body 371 may be made of a material whose oxide particle oxidated in air is fine enough to not affect the movement of the rigid body 371.

Alternatively, only the fluid 372 may be employed as the movable members 370 in either of the first, second and third embodiments, 300a, 300b and 300c, respectively, without employing the rigid bodies 371.

A shape of a sectional view of the cavity 350 taken through the rotation center of the clamper main body 310-1 may be a rectangular shape 450-1, a dumbbell shape 450-2, a hyperbolic shape 450-3, a half-hyperbolic shape 450-4, or an elliptical shape 450-5, as such shapes are described with reference to FIGS. 11, 12, 13A, 13B and 14, respectively.

Preferably, the clamper main body 310-1 (310-2), the intermediate cover member 330, and the cover member 360 are made of non-magnetic materials so that they are not influenced by magnetic interaction with the rigid bodies 371. Preferably, the clamper main body 310-1 (310-2) is made of an antioxidant material, or coated with an antioxidant material.

Figure 23:
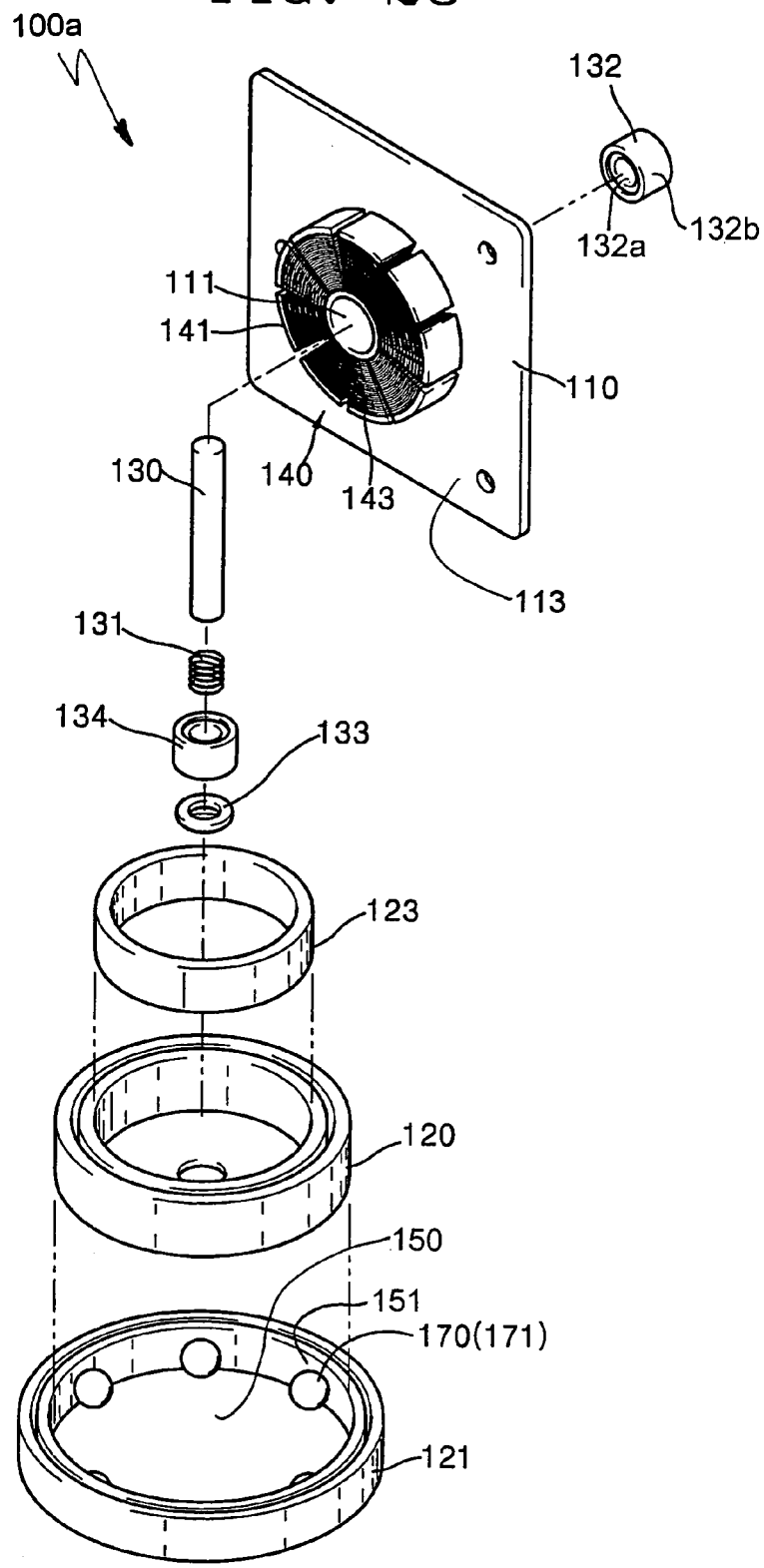
FIG. 23 is an exploded perspective view illustrating an embodiment of a self-compensating-dynamic-balancer integrated spindle motor for a disk player according to the present invention.
Figure 24:
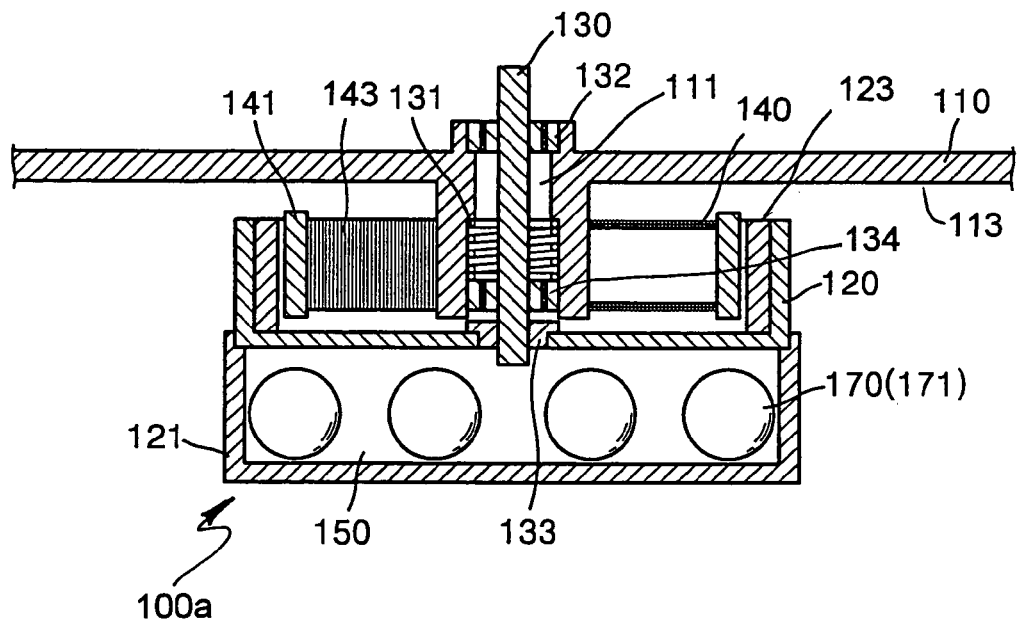
FIG. 24 is a sectional view of the self-compensating-dynamic-balancer integrated spindle motor illustrated in FIG. 23, wherein rigid bodies are employed as movable members.
Figure 25:
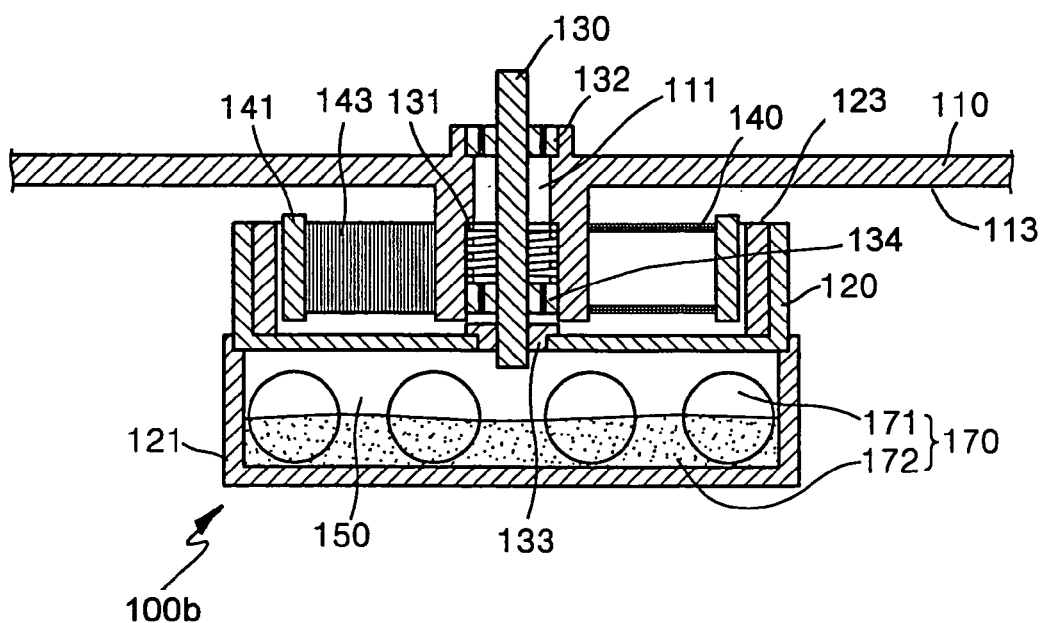
FIG. 25 is a sectional view of the self-compensating-dynamic-balancer integrated spindle motor illustrated in FIG. 23, wherein rigid bodies and a fluid are employed as movable members.

A self-compensating-dynamic-balancer integrated spindle motor for a disk player according to the present invention will be described in detail with reference to FIGS. 23 through 25. FIGS. 23-25 illustrate a first embodiment 100a thereof and FIG. 25 illustrates a second embodiment thereof.

The self-compensating-dynamic-balancer-integrated spindle motor 100a according to the present invention is constructed to be fixedly installed on a deck plate to rotate a turntable 200 fixed to the rotation shaft 130 of the spindle motor in a similar manner as spindle motor 100 shown in FIG. 2.

Referring now to FIG. 23, the self-compensating-dynamic-balancer integrated spindle motor 100a of the present invention comprises a motor base 110, a rotation shaft 130, a stator 140, a rotor 120, first and second bearings 132 and 134, a cylindrical case 121 having a cavity 150 with a cylindrical side wall 151 fixed to the rotor 120, and movable members 170 disposed within the cavity 150 of the case 121.

The motor base 110 is fixed to the deck plate 70 (FIG. 2), and has a through hole 111 at a center portion thereof. The first and second bearings 132 and 134 together with the rotation shaft 130 are fitted into the through hole 111.

The stator 140 is fixedly installed under a lower surface 113 of the motor base 110, and comprises a yoke 141 facing the rotor 120, and a coil portion 143 disposed at an inner side of the yoke 141. The first and second bearings 132 and 134 are disposed between the through hole 111 and the rotation shaft 130, and support the rotation shaft 130 in radial directions and an axial direction. The first and second bearings 132 and 134 are provided as a pair, and are disposed in the through hole 111 while being spaced a predetermined distance apart from each other. The first bearing 132 has an inner race 132a which is fixed to the rotation shaft 130 and an outer race 132b which is fixed to the through hole 111, to prevent the rotation shaft 130 from moving radially and axially. The second bearing 134 is slidably inserted into the through hole 111, to prevent the rotation shaft 130 from slanting. An elastic member 131 is disposed in the through hole 111 between the first and second bearings 132 and 134 so that rotational vibrations of the rotor 120 are prevented from being transferred to the motor base 110. In consideration of positional preciseness of the rotation shaft during high-speed rotation, metal bearings are preferably employed as the first and second bearings 132 and 134. Alternatively, another type of bearings, such as, for example, ball bearings or dynamic-air-pressure bearings may be employed.

The rotor 120 is fixed to one end of the rotation shaft 130, and a magnet 123 is installed in the rotor 120 to face the yoke 141. Here, a fixing member 133 is further provided at the engagement portion between the rotor 120 and the rotation shaft 130 to prevent the rotation shaft 130 from being separated from the rotor 120 or rotating idly.

The case 121 is fixed to the rotor 120 using an adhesive or grooves and projections which are formed at positions corresponding to each other. The movable members 170 comprise a plurality of rigid bodies 171 which are allowed to radially move away from the rotation center according to respective centrifugal forces thereof where the rotor 120 rotates.

FIGS. 23 and 24 show one example of a self-compensating-dynamic-balancer integrated spindle motor in which a plurality of rigid bodies 171 are contained in the cavity 150 of the case 121 as the movable members 170. The rigid bodies 171 are installed to roll or slide freely so that positions of the rigid bodies are determined by respective centrifugal forces where the rotor 120 rotates. Preferably, the rigid bodies 171 have one of a spherical shape, a cylindrical shape, a conical frustum shape or a sectorial pillar shape, such as for example the spherical shape 430-1, the cylindrical shape 430-2, the conical frustum shape 430-3, or the sectorial pillar shape 430-4 as described with reference to FIGS. 7, 8, 9 and 10, respectively. However, the shape of the rigid body 171 may be changed to another shape as long as the rigid body 171 is free to move in the cavity 150.

In the second embodiment of the self-compensating-dynamic-balancer spindle motor as shown in FIG. 25, the fluid 172 may be included together with the rigid bodies 171 as the movable members 170. Since the fluid 172 has a greater contacting area with the inner surfaces of the case 121 than the rigid bodies 171, where the fluid 172 is used in the cavity 150 together with the rigid bodies 171, the eccentric center of mass of the disk 1 (FIG. 2) which causes internal vibrations is more effectively compensated.

Preferably, the rigid bodies 171 are made of a non-magnetic material such as for example, one of the non-magnetic materials described above in reference to rigid bodies 271, so that the rigid bodies 171 are not influenced by the magnetic field of the magnet 123. Thus, the rigid bodies 171 move depending on the rotation of the rotor 120 and the position of the eccentric center of mass of the disk 1 (FIG. 2).

The rigid bodies 171 are preferably made of an antioxidant material, or coated with an antioxidant material so that the rigid bodies 171 are prevented from erratically moving in the case 121 due to oxidation and corrosion of the rigid bodies 171. Alternatively, the rigid bodies 171 may be made of a material whose oxide particle oxidated in air is fine so as not to affect the movement of the rigid bodies 171.

Alternatively, only the fluid 172 may be employed as the movable members 170 without employing the rigid bodies 171.

A shape of a sectional view of the cavity 150 taken through the rotation center of the cylindrical case 121 may be a rectangular shape 450-1, a dumbbell shape 450-2, a hyperbolic shape 450-3, a half-hyperbolic shape 450-4, or an elliptical shape 450-5, as such shapes are described with reference to FIGS. 11, 12, 13A, 13B and 14, respectively.

Preferably, the case 121 is made of a non-magnetic material so as to prevent the influence of magnetic forces interacting with the rigid bodies 171. In addition, it is preferable that the case 121 is made of an antioxidant materials, or coated with an antioxidant material, such as for example, the materials and coatings identified above with reference to the main body 412.

Referring again to FIG. 2, a second embodiment 10a of a self-compensating-dynamic-balancer integrated disk player according to the present invention comprises a deck base 50, a deck plate 70, damper members 60, a spindle motor 100, an optical pickup 75, and a clamper 300, as described above with reference to FIG. 2, and one of the self-compensating-dynamic-balancer integrated turntables 200a and 200b described with reference to FIGS. 15 through 17. The second embodiment of the self-compensating-dynamic-balancer integrated disk player is similarly constructed as the disk player 10 of FIG. 2 and differs in that the self-compensating-dynamic-balancer 400 schematically shown in FIG. 2 is integrated into the one turntable 200a or 200b.

A third embodiment of a self-compensating-dynamic-balancer integrated disk player according the present invention comprises a deck base 50, a deck plate 70, damper members 60, a spindle motor 100, a turntable 200 and an optical pickup 75, as described above with reference to FIG. 2, and one of a self-compensating-dynamic-balancer integrated clamper 300a, 300b and 300c described with reference to FIGS. 19 through 22. The third embodiment of the self-compensating-dynamic-balancer integrated disk player is similarly constructed as the disk player 10 of FIG. 2 and differs in that the self-compensating-dynamic-balancer 400 schematically shown in FIG. 2 is integrated into the one clamper 300a, 300b or 300c.

A fourth embodiment 10c of a self-compensating-dynamic-balancer integrated disk player according to the present invention comprises a deck base 50, a deck plate 70, clamper members 60, a turntable 200, an optical pickup 75, and a clamper 300, as described above with reference to FIG. 2, and one of the self-compensating-dynamic-balancer integrated spindle motors 100a and 100b described with reference to FIGS. 23 through 25. Thus, in the fourth embodiment of the self-compensating-dynamic-balancer integrated disk player the self-compensating-dynamic-balancer 400 schematically shown in FIG. 2 is integrated into the one spindle motor 100a or 100b.

A fifth embodiment 10d of a self-compensating-dynamic-balancer integrated disk player according to the present invention comprises a deck base 50, a deck plate 70, clamper members 60, a turntable 200, an optical pickup 75, and a clamper 300, as described above with reference to FIG. 2, and the self-compensating-dynamic-balancer integrated spindle motor turntable 500 described with reference to FIG. 18. The fifth embodiment is constructed similar to the second embodiment 10a as shown in FIG. 2 and differs in that the integrated spindle motor turntable 500 replaces the turntable 200a (200b) and the spindle motor 100.

In summary, in a self-compensating-dynamic-balancer disk player of the present invention, a self-compensating dynamic balancer 400 may be integrated into any rotating member such as the turntable 200, the clamper 300, and the spindle motor 100, and, may be employed in two or more rotating members taking into consideration the rotational speed of the disk 1 (FIG. 2), the range of allowable tolerances of the eccentric center of mass, and the like.

Figure 26:
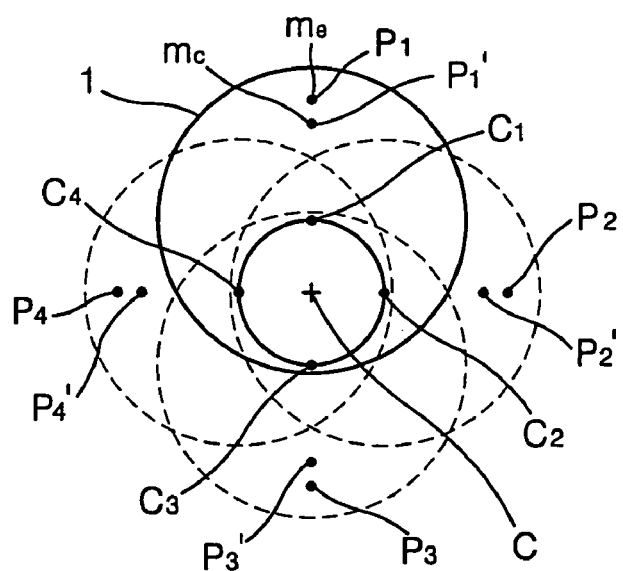
FIGS. 26 and 27 are schematic diagrams illustrating positional relations of positions of eccentric mass of a disk with positions of a rotation shaft with respect to a revolution center depending on rotational speeds of the disk, respectively, in a disk player having a self-compensating dynamic balancer according to the present invention.

Now, the vibration reduction effect of a disk player employing a self-compensating dynamic balancer 400 according to the present invention, incorporated in self-compensating-dynamic-balancer integrated rotating members, such as for example, the turntable 200a, 200b or 200c, the clamper 300a 300b or 300c, the spindle motor 100a or 100b, and the spindle motor turntable 500, will be described with reference to FIGS. 26 and 27.

Where the rotational frequency of the disk 1 is less than the natural frequency of the deck plate, as shown in FIG. 26, positions ($P_i$, i=1, 2, 3, and 4) of the eccentric center of mass $m_e$ of the disk 1, and positions ($P_i'$, i=1, 2, 3, and 4) of the weight center of the self-compensating dynamic balancer including the movable members and the cover member, that is, a compensating mass $m_c$ are positioned opposite to the revolution center C with respect to positions ($C_i$, i=1, 2, 3, and 4) of the rotation shaft, respectively. Therefore, the radius of revolution of the rotation shaft becomes greater.

Figure 27:
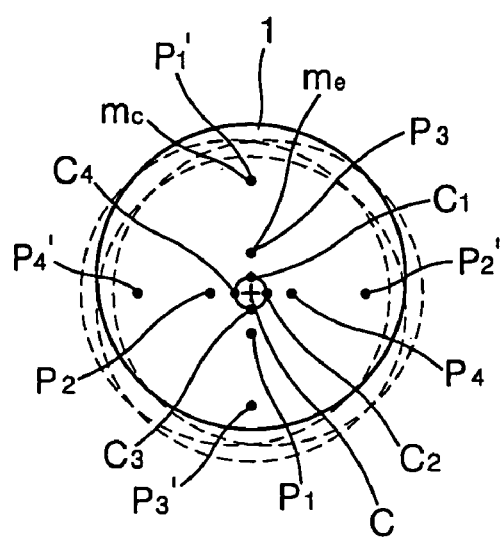

On the other hand, where the rotational frequency of the disk 1 is much greater than the natural frequency of the deck plate, and the disk 1 rotates substantially at normal speed, as shown in FIG. 27, the revolution center C and positions ($P_i$, i=1, 2, 3, and 4) of the eccentric mass $m_e$ of the disk 1 are positioned at the same side, and positions ($P_i'$, i=1, 2, 3, and 4) of a compensating mass $m_c$ are positioned at the opposite side due to centrifugal forces, respectively. Therefore, since unbalance due to the eccentric mass $m_e$ of the disk 1 is counterbalanced by the compensating mass $m_c$, the radius of revolution of the rotation shaft reduces markedly, and internal vibrations of the deck plate due to the eccentric mass $m_e$ of the disk 1 can be limited.

A self-compensating-dynamic-balancer integrated disk player, a self-compensating-dynamic-balancer integrated spindle motor, self-compensating-dynamic-balancer integrated members rotated by the spindle motor, which are configured as described above according to the present invention can effectively minimize internal vibrations due to the rotation of the disk by counterbalancing the eccentric mass of the disk which causing the internal vibrations with forces which are generated by the movable members due to centrifugal forces and act from the revolution center of the disk to outward in the cylindrical cavity.

A damper member of weak strength may be employed in a disk player according to the present invention so that external impact is dampened effectively. Accordingly, a disk player according to the present invention is appropriate for very high speed (greater than 6-speed) CD-ROM and DVD-ROM drives.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A self-compensating-dynamic-balancer integrated clamper for pressing a disk placed on a turntable of a disk player, the clamper comprising:
   a clamper main body provided with a cavity and rotating with the disk;
   a pressing member installed at the clamper main body for pressing the disk;
   movable members movably disposed in the cavity of the clamper main body and free to move within the cavity including movement across a center of rotation of the clamper main body; and
   a cover member joined to an opening of the main body to enclose the cavity.

2. The self-compensating-dynamic-balancer integrated clamper as claimed in claim 1, wherein the movable members comprise a plurality of rigid bodies and a fluid.

3. The self-compensating-dynamic-balancer integrated clamper as claimed in claim 2, wherein:
   the clamper main body comprises a cylindrical inner side wall and an another wall which form the cavity, and
   each rigid body comprises a spherical shape which is free to roll within the clamper main body.

4. The self-compensating-dynamic-balancer integrated clamper as claimed in claim 2, wherein:
   the clamper main body comprises a cylindrical inner side wall and an another wall which form the cavity, and
   each rigid body comprises a cylindrical shape which is free to roll in contact with the cylindrical inner sidewall.

5. The self-compensating-dynamic-balancer integrated clamper as claimed in claim 2, wherein:
   the clamper main body comprises a cylindrical inner side wall and an another wall which form the cavity, and
   each rigid body comprises a conical frustum shape which is free to roll between the another wall and the cover member.

6. The self-compensating-dynamic-balancer integrated clamper as claimed in claim 2, wherein:
   the clamper main body comprises a cylindrical inner side wall and an another wall which form the cavity, and
   each rigid body comprises a sectorial pillar shape which is permitted to slide between the another wall and the cover member.

7. The self-compensating-dynamic-balancer integrated clamper as claimed in claim 1, wherein the turntable comprises a magnet, a lower surface of the clamper main body contacts the disk, and the pressing member is a yoke installed at an inner lower portion of the clamper main body so as to press the disk by an interactive magnetic force between the yoke and the turntable.

8. The self-compensating-dynamic-balancer integrated clamper as claimed in claim 1, wherein the pressing member comprises:
   a pressing plate which is movable vertically, and
   an elastic member interposed between the clamper main body and the pressing plate.

9. The self-compensating-dynamic-balancer integrated clamper as claimed in claim 1, wherein a shape of a section of the cavity comprises a rectangular shape.

10. The self-compensating-dynamic-balancer integrated clamper as claimed in claim 1, wherein a shape of a section of the cavity comprises a dumbbell shape.

11. The self-compensating-dynamic-balancer integrated clamper as claimed in claim 1, wherein a shape of a section of the cavity comprises a hyperbolic shape which has a narrow portion at a center portion of the hyperbolic shape and wider portions toward edge sides of the hyperbolic shape.

12. The self-compensating-dynamic-balancer integrated clamper as claimed in claim 1 wherein a shape of a section of the cavity comprises a half-hyperbolic shape.

13. The self-compensating-dynamic-balancer integrated clamper as claimed in claim 1, wherein a shape of a section of the cavity comprises an elliptical shape which has a wide portion at a center portion of the elliptical shape and narrower portions toward edge sides of the elliptical shape.

14. The self-compensating-dynamic-balancer integrated clamper as claimed in claim 1, wherein the movable members comprise a plurality of rigid bodies.

15. The self-compensating-dynamic-balancer integrated clamper as claimed in claim 1, wherein the movable members comprise a fluid.

16. A self-compensating-dynamic-balancer integrated clamper for pressing a disk placed on a turntable of a disk player, the clamper comprising:
   a clamper main body which rotates with the disk, the main body comprising:
      a cylindrical inner wall,
      first and second transverse walls which cooperate with the inner wall to form a cavity, and
      a plurality of spherical shaped rigid bodies disposed in the cavity and free to move within the cavity including movement across a center of rotation of the main body; and
   a pressing member installed at the clamper main body for pressing the disk.

17. The self-compensating-dynamic-balancer integrated clamper as claimed in claim 16, further comprising a fluid disposed in the cavity along with the spherical shaped rigid bodies.

18. A self-compensating-dynamic-balancer integrated clamper for pressing a disk placed on a turntable of a disk player, the clamper comprising:
   a clamper main body provided with a cavity and rotating with the disk;
   a pressing member installed at the clamper main body for pressing the disk;
   movable members movably disposed in the cavity of the clamper main body; and
   a cover member joined to an opening of the main body to enclose the cavity, wherein:
   the movable members are free to move unobstructed within the cavity, including movement across a center of rotation of the clamper main body.

19. The self-compensating-dynamic-balancer integrated clamper as claimed in claim 18, wherein the movable members comprise a plurality of rigid bodies and a fluid.

* * * * *